(12) United States Patent
Kostarnov et al.

(10) Patent No.: US 8,250,342 B1
(45) Date of Patent: Aug. 21, 2012

(54) DIGITAL SIGNAL PROCESSING ENGINE

(75) Inventors: Igor Kostarnov, Edinburgh (GB); Richard Walke, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 788 days.

(21) Appl. No.: 12/008,352

(22) Filed: Jan. 9, 2008

(51) Int. Cl.
*G06F 15/00* (2006.01)
*G06F 15/76* (2006.01)

(52) U.S. Cl. ........................................ 712/35
(58) Field of Classification Search .................. None
See application file for complete search history.

(56) References Cited

U.S. PATENT DOCUMENTS

| | | | |
|---|---|---|---|
| 5,642,489 A * | 6/1997 | Bland et al. | 710/308 |
| 5,913,049 A * | 6/1999 | Shiell et al. | 712/215 |
| 6,941,548 B2 * | 9/2005 | Goodwin et al. | 717/151 |
| 7,089,344 B1 * | 8/2006 | Rader et al. | 710/308 |
| 7,219,212 B1 * | 5/2007 | Sanghavi et al. | 712/6 |
| 7,346,881 B2 * | 3/2008 | Wang et al. | 716/17 |
| 7,376,812 B1 * | 5/2008 | Sanghavi et al. | 712/24 |
| 2002/0111977 A1 * | 8/2002 | Keay | 708/400 |

OTHER PUBLICATIONS

Xtensa LX2, product brief, Tensilica, Apr. 2007, pp. 11.*
Huynh et al., Tensilica Xtensa, CS 451—Advanced processor Architecture, ITC Labs and Classrooms, Nov. 15, 2005, Powerpoint presentation, 77 slides.*
Tensilica News Release, Tensilica Adds Support for Low-Cost, Hardware-Based Simulations of Diamond Standard Processors, Apr. 17, 2007, pp. 5.*
Xtensa LX Microprocessor: Overview Handbook, Tensilica, Inc., Sep. 2004.*
Tensilica Internal Report 1.1, Rossi et al., Politecnico di Torino, Torino, Italy, Jun. 2006.*
Xilinx, Multi-Channel (MCH) PLBv46 Slave Burst (v1.00a), Apr. 24, 2009.*
Texas Instruments, TMS320C6413, TMS 320C6410, Fixed Point Digital Signal Processors. Data Manual, Literature No. SPRS247, Apr. 2004, Revised Jan. 2006, 145 pages.
Fisher, J. A. et al. "Embedded Computing". A VLIW Approach to Architecture, Compilers and Tools, Elsevier, Inc., 2005, pp. 3; 54; 57-70; 76-77; 91-121; 127-128; 191-195; and 257-271.

* cited by examiner

*Primary Examiner* — Corey S Faherty
(74) *Attorney, Agent, or Firm* — W. Eric Webostad; John J. King

(57) ABSTRACT

Architecture of a digital signal processing engine and method for digital signal processing therewith are described. Instruction memory stores an instruction which has at least one opcode which is selected from a group consisting of a control opcode, a digital signal processing (DSP) opcode, and a memory opcode. A digital signal processing engine includes a controller for receiving the control opcode, a DSP core for receiving the DSP opcode, and a memory interface for receiving the memory opcode. The controller, the digital signal processing core, and the memory interface are separate pipelines at least two of which have different numbers of stages. The controller may include an arithmetic logic unit, a base address regfile, and a branch/decode circuit.

39 Claims, 16 Drawing Sheets

```
'Constant declaration
.set    fixed_point 0
.set    coef      1

.set    width_A   4
.set    height_A  4
.set    width_B   4
.set    height_B  width_A
.set    width_R   width_B
.set    height_R  height_A .set    YES       1
.set    NO        0
.set    complex   NO .head
.wordlength 16
.cwordlength 4
.fixedpoint fixed_point
.asize     width_A*height_A
.bsize     width_B*height_B 'Machine constant declaration
.set    dsp_pipeline_depth       11
.set    ctrl_pipeline_depth       6
.set    post_jump_pipeline_depth  6
.set    loop_pipeline_depth       5

.set    i              1
.set    n              2

.data A
.word 1
.rept width_A*height_A-1
.word  5*coef
.endr
```

```
.data B

.for i in 0 to width_A*height_A-1
.word  coef*i
.endfor

.text
_start:

'for(i=0; i<n; i++) (guaranteed n>0)
C_LDI c[i], 0;
C_LDI c[n], width_R-1;
.fillslots . ctrl_pipeline_depth _i_loop:
      C_CNE    b[0], c[i], c[n];
      C_ADDI   c[i], c[i], 1 ;

.for j in 0 to height_R-2
  D_MULT d0, d0, d0 | ( STEP 1 : STEP width_B : STEP 0 );
  .for k in 1 to width_A-2
     D_MADD d0, d0, d0 | ( STEP 1 : STEP width_B : STEP 0 );
  .endfor
  D_MADD d0, d0, d0 | ( STEP 1-width_A : STEP 1-(width_A-1)*height_A : STEP 1 )!;
.endfor 'last row
D_MULT d0, d0, d0 | ( STEP 1 : STEP width_B : STEP 0 );
  .for k in 1 to width_A-2
     D_MADD d0, d0, d0 | ( STEP 1 : STEP width_B : STEP 0 );
  .endfor
D_MADD d0, d0, d0 | ( STEP 1 : SETC 0 : STEP 0 )!;

.fillslots _i_loop loop_pipeline_depth+1
C_JC     b[0], _i_loop;
.fillslots . post_jump_pipeline_depth _halt:
.rept post_jump_pipeline_depth+1
  c_jmp _halt;
.endr
```

FIG. 9-2

```
'Constant declaration
.set    fixed_point         16
.set    sqrt_iteration_number 10
.set    i_initial           0
.set    matrix_size         32

.set    L_real              0
..set   L_imag              matrix_size*matrix_size
.set    a_real              0
.set    a_imag              a_real+matrix_size*matrix_size
.set    cregs_number        32
.head
.wordlength 32
.cwordlength 12
.fixedpoint 16
.asize   matrix_size*matrix_size*2
.bsize   matrix_size*matrix_size*2
.dregs   16, 0, 0, 0, 65536, 32768, 196608
.cregs   cregs_number
'Machine constant declaration
.set    dsp_pipeline_depth         11
.set    ctrl_pipeline_depth        2
.set    post_jump_pipeline_depth   3
.set    loop_pipeline_depth        ctrl_pipeline_depth+2
'Control register declaration
.set    c_const_0       0
.set    sqrt_iter_counter  1
.set    sqrt_iter_limit    2
.set    n               3
.set    i               4
.set    j               5
.set    i_row_real      6
.set    j_row_real      7
.set    jump_k_real     8
.set    jump_k_imag     9
.set    i_j_index       10
.set    j_i_index       11
.set    i_row_imag      12
.set    j_row_imag      13
.set    link_register   cregs_number-1
'Branch register declaration
.set i_branch 0
.set j_branch 1
.set i_not_0 1
.set sqrt_branch 2
.set i_j_ne 3
```

FIG. 10-1

```
'DSP register declaration
.set    memory    0
.set    feedback  1
.set    d_const_0 2
.set    const_1   3 'const_1=65536
.set    const_05  4 'const_05=32768
.set    const_3   5 'const_3=196608
.set    sqrt_arg  6
.set    sqrt_res  7
.set    imag_acc  8
.set    local     10
'------------------
' End of constant declaration
'------------------
.data A
.word 48717,  36694,  31279,  36479,  39609,  35777,  33804,  24637
.rept matrix_size-8
.word 0
.endr
```

...

```
.word  0,   0,   0,   0,   0,   0,   0,   27033   'a real
' extension to identity matrix:
.rept matrix_size-8
 .rept matrix_size
   .word 0
 .endr
 .word 1
.endr .rept (matrix_size-8)*matrix_size
.word 0
.endr .data B .word   48717,  36694,  31279,  36479,  39609,  35777,  33804,  24637
.rept matrix_size-8
.word 0
.endr
```

...

```
.word   24637,  22744,  21084,  22993,  27348,  25995,  20712,  27033   'a real
' extension to identity matrix:
.rept matrix_size-8
 .rept matrix_size
   .word 0
 .endr
 .word 1
.endr
```

.word   -1938,   -1095,   3021,   2290,   -3390,   2902,   -3654,   0   'a imaginary
    .rept matrix_size-8
    .word 0
    .endr
    .rept (matrix_size-8)*matrix_size
    .word 0
    .endr .text _start:
    C_LDI c[i_row_real], 0;
    C_LDI c[i_row_imag], L_imag/8;
    .rept 3 'load L_imag, a better method needed!
    .fillslots . ctrl_pipeline_depth
    C_ADD c[i_row_imag], c[i_row_imag], c[i_row_imag];
    .endr
    .fillslots . ctrl_pipeline_depth
    C_ADDI c[i_row_imag], c[i_row_imag], L_imag-((L_imag/8)*8);

'for(i=0; i<n; i++) (guaranteed n>0)
    C_LDI c[i], i_initial;
    C_LDI c[n], matrix_size;
    .fillslots . ctrl_pipeline_depth '***** Unrolled loop start
_i_loop_unr:
    C_ADD   c[j], c[i], c[c_const_0];
    C_ADD   c[j_row_real], c[i_row_real], c[c_const_0];
    C_ADD   c[j_row_imag], c[i_row_imag], c[c_const_0];

C_CNE   b[i_not_0], c[i], c[c_const_0];
    .fillslots . ctrl_pipeline_depth-2

C_LDI   c[jump_k_real], _end_k_loop_real_unr;
    C_LDI   c[jump_k_imag], _end_k_loop_imag_unr;
    .fillslots . ctrl_pipeline_depth-post_jump_pipeline_depth-2
    C_JCN   b[i_not_0], _bypass_k_loop_address_unr;
    .fillslots . post_jump_pipeline_depth C_SUB   c[jump_k_real], c[jump_k_real], c[i];
    C_SUB   c[jump_k_imag], c[jump_k_imag], c[i];
    .fillslots . ctrl_pipeline_depth-1
    C_SUB   c[jump_k_real], c[jump_k_real], c[i];
    C_SUB   c[jump_k_imag], c[jump_k_imag], c[i];

_bypass_k_loop_address_unr:

C_CNE   b[j_branch], c[j],c[n];
    .fillslots . 3
```

FIG. 10-3

```
_j_loop_unr:
    .fillslots . loop_pipeline_depth-3
    C_JCN    b[j_branch], _j_loop_out_unr;
    C_ADD    c[link_register], c[c_const_0], c[jump_k_real] | (SETC 0 : SETC 0 : SETC 0);
    C_CNE    b[i_j_ne], c[i], c[j];
    C_ADD    c[i_j_index], c[i_row_real], c[j];
    C_ADD    c[j_i_index], c[j_row_real], c[i];
    C_ADDI   c[j], c[j], 1;
    'unrolled (k=0; k<i-1; k++):
    .fillslots . loop_pipeline_depth-5
    C_ADD c[link_register], c[c_const_0], c[jump_k_imag];      ' this is for imaginary part
    'C_JR c[link_register] |
    D_MULT d[sqrt_arg], d[const_1], d0 | (IMM a_real, m[i_j_index] : SETC 0 : SETC 0);
    '.fillslots . post_jump_pipeline_depth
_end_k_loop_real_unr:
    (SETC 0 : SETC 0 : SETC 0);
    '.fillslots . loop_pipeline_depth-post_jump_pipeline_depth-2
    'C_JR c[link_register] |
    D_MULT d[imag_acc], d[const_1], d0 | (IMM a_imag, m[i_j_index] : SETC 0 : SETC 0);
    .fillslots . post_jump_pipeline_depth
_end_k_loop_imag_unr:
    C_JC  b[i_j_ne], _i_j_not_equal_unr;
    .fillslots . post_jump_pipeline_depth
    C_JMP _sqrt | D_MULT d[sqrt_res], d[const_1], d[const_1];   'U=sqrt estimate
    C_LDI c[link_register], _return_sqrt_unr;
    .fillslots . post_jump_pipeline_depth-1
_return_sqrt_unr:
    D_MULT d0, d[sqrt_arg], d[sqrt_res] | (STEP 0 : STEP 0 : IMM L_imag, m[i_j_index])!;
    C_JMP _end_i_j_equal_check_unr;
    .fillslots . post_jump_pipeline_depth
_i_j_not_equal_unr:
    .fillslots . dsp_pipeline_depth-post_jump_pipeline_depth-2
    D_MULT d0, d[sqrt_arg], d[sqrt_res] | (STEP 0 : STEP 0 : IMM L_real, m[j_i_index])!;
    D_MULT d0, d[imag_acc], d[sqrt_res] | (STEP 0 : STEP 0 : IMM L_imag, m[j_i_index])!;
_end_i_j_equal_check_unr:
    C_JMP _j_loop_unr;
    C_CNE  b[j_branch], c[j],c[n];
    C_ADD  c[j_row_real], c[j_row_real], c[n];
    C_ADD  c[j_row_imag], c[j_row_imag], c[n];
    .fillslots _end_i_j_equal_check_unr post_jump_pipeline_depth+1
_j_loop_out_unr:
    C_ADDI c[i], c[i], 1;
    C_ADD  c[i_row_real], c[i_row_real], c[n];
    C_ADD  c[i_row_imag], c[i_row_imag], c[n];
    .fillslots _j_loop_out_unr ctrl_pipeline_depth-post_jump_pipeline_depth-1

'***** End of unrolled loop start
```

FIG. 10-4

```
'for(i=1; i<n; i++) (guaranteed n>0)
    C_LDI  c[i], 1;
    .fillslots . ctrl_pipeline_depth
    C_LDI  c[jump_k_real], _end_k_loop_real;
    C_LDI  c[jump_k_imag], _end_k_loop_imag;
    .fillslots . ctrl_pipeline_depth
_i_loop:
    C_SUBI  c[jump_k_real], c[jump_k_real], 1;
    C_SUBI  c[jump_k_imag], c[jump_k_imag], 1;
    C_CNE   b[i_branch], c[i], c[n];
    C_ADD   c[j], c[i], c[c_const_0];
    C_ADD   c[j_row_real], c[i_row_real], c[c_const_0];
    C_ADD   c[j_row_imag], c[i_row_imag], c[c_const_0];
    C_SUBI  c[jump_k_real], c[jump_k_real], 1;
    C_SUBI  c[jump_k_imag], c[jump_k_imag], 1;
    C_CNE   b[j_branch], c[j],c[n];
    .fillslots . 3
    C_ADD   c[link_register], c[c_const_0], c[jump_k_real] | (SETC 0 : SETC 0 : SETC 0);
    C_CNE   b[i_j_ne], c[i], c[j];
    .fillslots . 5
_j_loop:
    '.fillslots . loop_pipeline_depth-5
    C_JCN   b[j_branch], _j_loop_out;
    C_ADD   c[i_j_index], c[i_row_real], c[j];
    NOP;
    C_ADD   c[j_i_index], c[j_row_real], c[i];
    'unrolled (k=0; k<i-1; k++):
    C_ADD c[link_register], c[c_const_0], c[jump_k_imag];    ' this is for imaginary part
    C_JR  c[link_register];
    C_ADDI  c[j], c[j], 1 | D_MULT d[sqrt_arg], d[const_1], d0 | (IMM a_real, m[i_j_index] : SETC 0 : SETC 0);
    .fillslots . post_jump_pipeline_depth-1
    .rept matrix_size-1
    D_MSUB d[sqrt_arg], d0, d0 | (STEP 0, m[i_row_real] : STEP 0, m[j_row_real] : STEP 0) ;
    D_MSUB d[sqrt_arg], d0, d0 | (STEP 1, m[i_row_imag] : STEP 1, m[j_row_imag] : STEP 0) ;
    .endr
    C_JR  c[link_register] | D_MSUB d[sqrt_arg], d0, d0 | (STEP 0, m[i_row_real] : STEP 0, m[j_row_real] : STEP 0) ;
    D_MSUB d[sqrt_arg], d0, d0 | (STEP 1, m[i_row_imag] : STEP 1, m[j_row_imag] : STEP 0) ;
_end_k_loop_real:
    D_MULT d[imag_acc], d[const_1], d0 | (IMM a_imag, m[i_j_index] : SETC 0 : SETC 0);
    (SETC 0 : SETC 0 : SETC 0);
    .fillslots . post_jump_pipeline_depth-1
    .rept matrix_size-1
    D_MSUB d[imag_acc], d0, d0 | (STEP 0, m[i_row_real] : STEP 0, m[j_row_imag] : STEP 0) ;
    D_MADD d[imag_acc], d0, d0 | (STEP 1, m[i_row_imag] : STEP 1, m[j_row_real] : STEP 0);
    .endr
    C_JC b[i_j_ne], _i_j_not_equal | D_MSUB d[imag_acc], d0, d0 | (STEP 0, m[i_row_real] : STEP 0, m[j_row_imag] : STEP 0);
    C_CNE   b[j_branch], c[j],c[n] | D_MADD d[imag_acc], d0, d0 | (STEP 1, m[i_row_imag] : STEP 1, m[j_row_real] : STEP 0);
_end_k_loop_imag:
    .fillslots . post_jump_pipeline_depth-1
    C_JMP _sqrt | D_MULT d[sqrt_res], d[const_1], d[const_1]; ' U=sqrt estimate
    C_LDI c[link_register], _return_sqrt;
    .fillslots . post_jump_pipeline_depth-1
```

FIG. 10-5

```
_return_sqrt:
    C_JMP _j_loop | D_MULT d0, d[sqrt_arg], d[sqrt_res] | (STEP 0 : STEP 0 : IMM L_imag,
m[i_j_index])!;
    C_CNE  b[i_j_ne], c[i], c[j];
    C_ADD  c[j_row_real], c[j_row_real], c[n];
    C_ADD  c[j_row_imag], c[j_row_imag], c[n];
    C_ADD  c[link_register], c[c_const_0], c[jump_k_real] | (SETC 0 : SETC 0 : SETC 0);
    .fillslots . post_jump_pipeline_depth-4
_i_j_not_equal:
    .fillslots . dsp_pipeline_depth-post_jump_pipeline_depth-3
    C_JMP _j_loop ;
    C_CNE  b[i_j_ne], c[i], c[j];
    C_ADD  c[link_register], c[c_const_0], c[jump_k_real] | (SETC 0 : SETC 0 : SETC 0);
    C_ADD  c[j_row_real], c[j_row_real], c[n] | D_MULT d0, d[sqrt_arg], d[sqrt_res] | (STEP 0 : STEP 0
IMM L_real, m[j_i_index])!;
    C_ADD  c[j_row_imag], c[j_row_imag], c[n] | D_MULT d0, d[imag_acc], d[sqrt_res] | (STEP 0 :
STEP 0 : IMM L_imag, m[j_i_index])!;
    .fillslots . post_jump_pipeline_depth-4
_j_loop_out:
    C_ADDI c[i], c[i], 1;
    C_ADD  c[i_row_real], c[i_row_real], c[n];
    C_ADD  c[i_row_imag], c[i_row_imag], c[n];
    .fillslots _j_loop_out ctrl_pipeline_depth-post_jump_pipeline_depth-1
    C_JC b[i_branch], _i_loop;
    .fillslots . post_jump_pipeline_depth + 1
_halt:
.rept post_jump_pipeline_depth+2
 c_jmp _halt;
.endr
' *** Square root (reciprocal) function ***
_sqrt:
    C_LDI c[sqrt_iter_counter], 0;  'U=1
    C_LDI c[sqrt_iter_limit], sqrt_iteration_number;
    .fillslots . dsp_pipeline_depth-post_jump_pipeline_depth-3
_sqrt_loop:
    C_CNE    b[sqrt_branch], c[sqrt_iter_counter], c[sqrt_iter_limit];
    C_ADDI   c[sqrt_iter_counter], c[sqrt_iter_counter], 1 ;
    D_MULT   d[local+1], d[sqrt_res], d[sqrt_arg]; 'local1=V*U
    D_MULT   d[local+2], d[sqrt_res], d[const_05];  'local2=0.5*U
    .fillslots . dsp_pipeline_depth-2
    D_MULT   d[local+3], d[const_3], d[const_1]; '3 -> P
    D_MSUB   d[local+3], d[local+1], d[sqrt_res];
    .fillslots . dsp_pipeline_depth
    D_MULT   d[sqrt_res], d[local+2], d[local+3]; 'U=0.5U(3-VU^2)
    .fillslots . dsp_pipeline_depth-post_jump_pipeline_depth-3
    C_JC  b[sqrt_branch], _sqrt_loop;
    .fillslots . post_jump_pipeline_depth
    C_JR  c[link_register];
    .fillslots . post_jump_pipeline_depth
_finish:
```

DIGITAL SIGNAL PROCESSING ENGINE

A portion of the disclosure of this patent document contains material which is subject to copyright protection. The copyright owner has no objection to the facsimile reproduction by anyone of the patent disclosure as it appears in the Patent and Trademark Office patent files or records, but otherwise reserves all copyright rights whatsoever.

FIELD OF THE INVENTION

One or more aspects of the invention relate generally to digital signal processing and, more particularly, to a digital signal processing engine.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Heretofore, performance of a pipelined processor instantiated in programmable logic of an FPGA ("FPGA fabric") was limited by having all pipelines of the design being of equal length. Thus, shorter pipelines in a design were padded to have an equivalent number of clocked stages as the longest pipeline in the design. This significantly slowed performance. Another limitation associated with prior pipelined designs implemented in FPGA fabric included an inability to operate at the maximum frequency of an embedded microprocessor, for example.

Accordingly, it would be desirable and useful to provide a pipelined design that overcomes one or more of the above-mentioned limitations.

SUMMARY OF THE INVENTION

One or more aspects of the invention generally relate to digital signal processing and, more particularly, to a digital signal processing engine.

An aspect of the invention relates generally to a digital signal processing engine architecture including instruction memory for storing an instruction. The instruction has at least one opcode which is selected from a group consisting of a control opcode, a digital signal processing opcode, and a memory opcode. A digital signal processing engine includes a controller, a digital signal processing core, and a memory interface. The controller is coupled to the instruction memory to obtain the control opcode. The digital signal processing core is coupled to the instruction memory to obtain the digital signal processing opcode and is configurable at least for multiplication of two operands. The memory interface is coupled to the instruction memory to obtain the memory opcode. The controller, the digital signal processing core, and the memory interface are separate pipelines at least two of which have different numbers of stages.

Another aspect of the invention relates generally to a method for digital signal processing. An instruction is obtained, the instruction having at least one of three parts, the three parts including a controller opcode part, a digital signal processing opcode part, and a memory opcode part. The instruction is pipelined with a digital signal processing engine, the digital signal processing engine configured to separately pipeline each of the three parts as follows: the controller opcode part of the instruction is pipelined with a first pipeline; the digital signal processing opcode part is pipelined with a second pipeline; and the memory opcode part is pipelined with a third pipeline. At least two of the first pipeline, the second pipeline, and the third pipeline have a different number of clocked stages.

Yet another aspect of the invention relates generally to a digital signal processing system including a System-on-a-Chip host integrated circuit, the host integrated circuit including a plurality of digital signal processing engines. The digital signal processing engines share a common bus for communication. At least a portion of the digital signal processing engines is respectively coupled to at least one associated design core instantiated in programmable logic. The digital signal processing engines are coupled to instruction memory for storing instructions. Each of the instructions has at least one opcode selected from a group consisting of a control opcode, a digital signal processing opcode, and a memory opcode. Each of the digital signal processing engines includes a controller, a digital signal processing core, and a memory interface. The controller is coupled to the instruction memory to obtain the control opcode. The digital signal processing core is coupled to the instruction memory to obtain the digital signal processing opcode and is configurable at least for multiplication of two operands. The memory interface is coupled to the instruction memory to obtain the memory opcode. The controller, the digital signal processing core, and the memory interface of each of the digital signal processing engines are separate pipelines at least two of which have different numbers of stages.

An aspect of the invention relates generally to a digital signal processing engine. A controller includes an arithmetic logic unit, a base address regfile, and branch/decode logic. The controller is coupled to receive a control opcode of an instruction to the branch/decode logic. The branch/decode logic is configured to decode the control opcode to provide a decoded opcode and to obtain a branch address from the control opcode for branching to obtain another instruction. The arithmetic logic unit is coupled to receive the decoded opcode and to populate the base address regfile with a base address responsive to the decoded opcode. The arithmetic logic unit is capable of incrementing the base address responsive to the opcode for address generation.

Another aspect of the invention relates generally to an instruction set for a digital signal processing engine including control syllable opcodes, digital signal processing syllable opcodes, and memory syllable opcodes. The control syllable opcodes include a jump opcode and a conditional jump opcode, the jump opcode and the conditional jump opcode for jumping to a specified address to facilitate use of a plurality of pipelines of different depths. The memory syllable opcodes selected include a no operation opcode, a set counter opcode, and an increase counter opcode.

Yet another aspect of the invention relates generally to a digital signal processing engine including memory control blocks coupled for parallel pipelined operation. The memory control blocks each include shadow storage for storing base addresses. Each of the memory control blocks includes a counter and an adder. The adder is coupled to receive a base address output from the shadow storage. The counter is for providing an increment for addition to the base address to sequentially generate memory addresses.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 9, sequentially FIGS. 9-1 through 9-2, is a program listing depicting an exemplary embodiment of a four-by-four matrix multiplication program listing.

FIG. 10, sequentially FIGS. 10-1 through 10-6, is a program listing depicting an exemplary embodiment of a Cholesky decomposition program listing.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
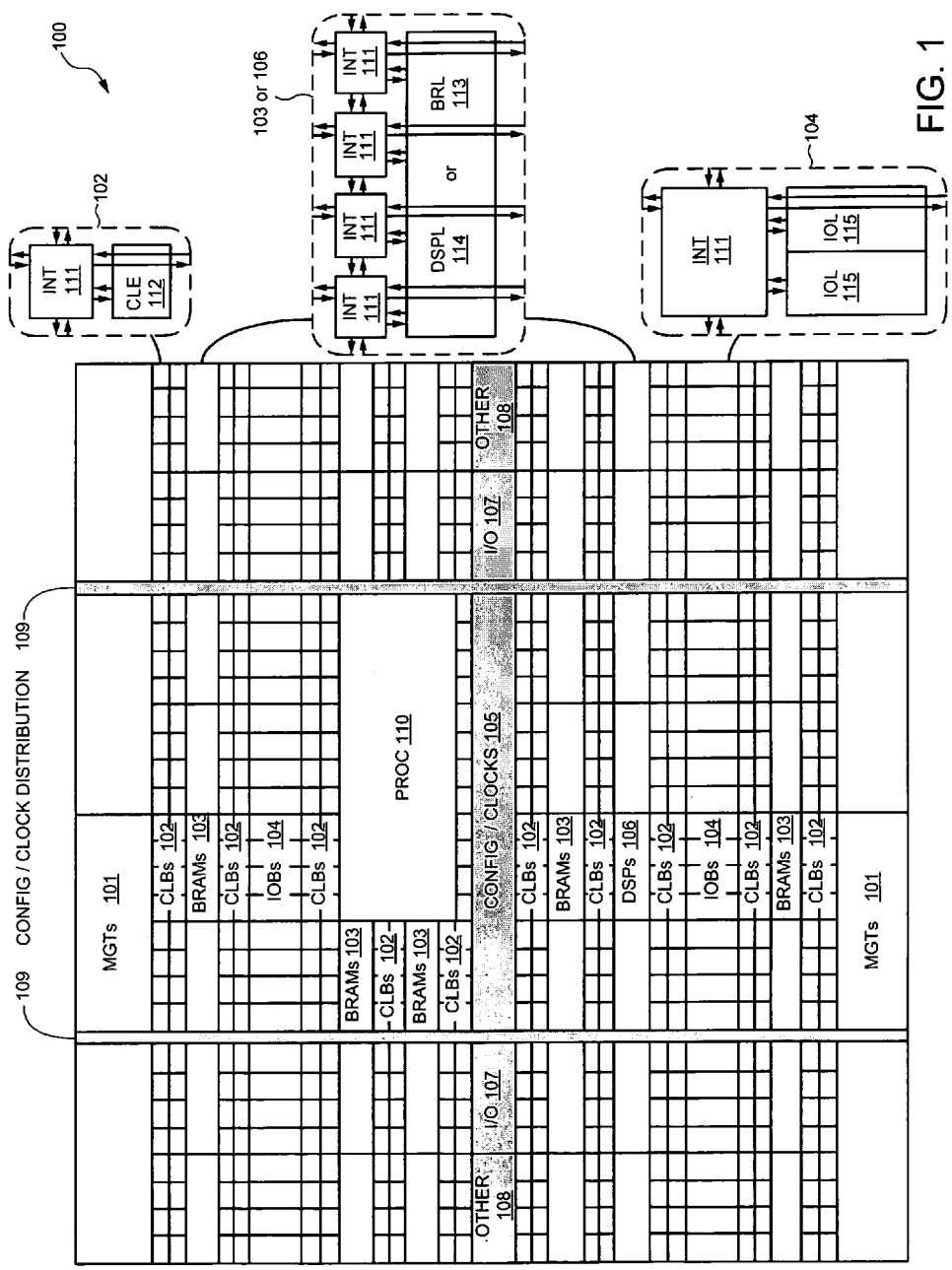
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 or Virtex™-5 FPGA from Xilinx of San Jose, Calif. However, it should be appreciate that any of a variety of FPGAs may be used.

Figure 2:
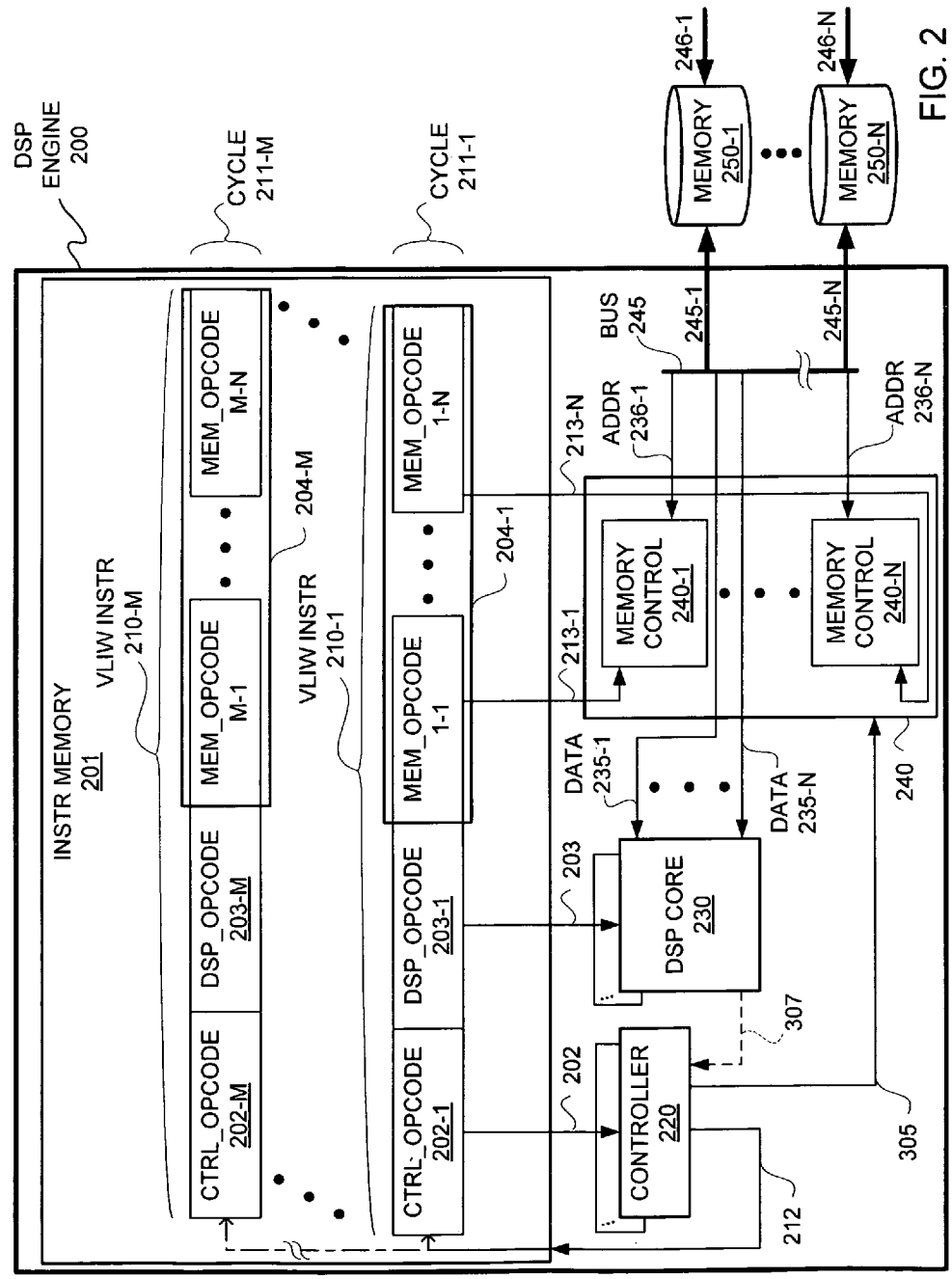
FIG. 2 is a block diagram depicting an exemplary embodiment of a digital signal processing engine coupled to memory.

FIG. 2 is a block diagram depicting an exemplary embodiment of a digital signal processing engine 200 coupled to memory 250. Memory 250 may be either internal or external to a host integrated circuit in which DSP engine 200 is instantiated, and may be formed of one or more memory integrated circuits. For purposes of clarity by way of example and not limitation, it shall be assumed that engine 200 may be instantiated in an FPGA; however, other known circuits may be used, as should be apparent from the following description. In general, DSP engine 200 may be a standalone device, or may be located in any type of host integrated circuit that may include other functional blocks. In some instances, the host integrated circuit may be a System-on-a-Chip (SoC), where several standalone chips or functional units are integrated into a single chip or package.

Engine 200 includes instruction memory 201, controller 220, digital signal processing core 230, and memory interface 240. There may be more than one of either or both controller 220 and DSP core 230. Instruction memory 201 may be implemented as a form of read-only memory or flash memory capable of rewritable storage. Alternatively, instruction memory 201 may be implemented by preloading RAM with instructions. It should be appreciated that even though single instances of lines or blocks are illustratively shown, there may in implementation be multiple instances of these to accommodate communicating and processing bits in parallel.

In this example, Very Large Instruction Word ("VLIW") instructions 210-1 through 210-M, for M a positive integer greater than one, are illustratively shown as being stored in instruction memory 201. Each VLIW instruction 210-1 through 210-M (collectively and singly "VLIW instruction 210"), includes a control operation code ("opcode"), a digital signal processing opcode, and one or more memory opcodes. As indicated above, there may be more than one controller 220 or core 230. For multiple controllers 220 or cores 230, they can have their own opcode or share the same opcode from a VLIW instruction. For example, for cores 230 sharing the same opcode from a VLIW instruction, this is a Single Instruction Multiple Data ("SIMD") mode of operation. Furthermore, for example, for digital signal processing cores 230 obtaining their own opcode from a VLIW instruction, this is a Multiple Instruction Multiple Data ("MIMD") mode of operation. However, for purposes of clarity by way of example and not limitation, it shall be assumed that a single controller 220 and a single core 230 are implemented. Thus, for example, VLIW instruction 210-1 includes control opcode 202-1, DSP opcode 203-1, and memory opcodes 1-1 through 1-N, for N a positive integer equal to or greater than one. Likewise, VLIW instruction 210-M includes control opcode 202-M, DSP opcode 203-M, and memory opcodes M-1 through M-N. For purposes of clarity, one or more memory opcodes 1-1 through 1-N are referenced as memory opcode 204-1, and one or more memory opcodes M-1 through M-N are referenced as memory opcode 204-M. Along those lines, one or more opcodes from a memory opcode of memory opcodes 204-1 through 204-M issued from an instruction of VLIW instructions 210-1 through 210-M are referred to as memory opcodes 213-1 through 213-N, or simply memory opcode 213 meaning either or both a single memory opcode or a plurality of memory opcodes. For purposes of clarity, control opcodes 202-1 through 202-M are referred to as control opcode 202, to reflect either or both a singular opcode or a plurality of opcodes. Thus, it should be appreciated that digital signal processing engine 200 may be considered what is known as a "VLIW machine." Conventional VLIW machine architectures are described in Fisher, J. A., P. Faraboschi, C. Young "Embedded Computing. A VLIW Approach to Architecture, Compilers, and Tools." Boston: Morgan Kaufmann Publishers, 2005.

There are multiple memory control blocks 240-1 through 240-N forming memory interface 240, and thus for each memory control block there is a separate memory opcode 213. For purposes of clarity by way of example and not limitation, it shall be assumed that there are three memory control blocks, which are referenced herein as memory interfaces A, B, and P, and thus N is equal to three. However, it should be appreciated that fewer or more than three memory control blocks may be implemented.

Each control opcode 202 may be generally limited to flow control of a pipeline of engine 200. After obtaining a VLIW instruction 210 from instruction memory 201 or after obtaining data from memory 250 responsive to a base address 305 passed from controller 220 to memory interface 240, control opcodes 202 may be processed independently from digital signal processing opcodes 203. A digital signal processing opcode 203 is an instruction with respect to how to process data. Known examples of processing data include addition and subtraction, among other known mathematical operations for processing data, some of which are described in additional detail below herein. Data manipulation by digital signal processing core 230 of engine 200 may be binary data, floating point, fixed point, or integer-based, or a combination thereof. A memory opcode 213 for a VLIW instruction 210 may indicate where in memory 250 data is to be read from and where in memory 250 data is to be written to. External data, control and address information, for example to be provided to memory 250, may be provided via bus 246, as described below in additional detail.

There may be as few as one opcode present in a VLIW instruction 210. For example, there may be a control opcode 202 and no other opcodes in a VLIW instruction 210. Moreover, there may be a digital signal processing opcode 203 and no other opcodes in a VLIW instruction 210. Furthermore, there may be one or more memory opcodes 213 and no other opcodes in a VLIW instruction 210.

However, there may be any combination of opcodes in a VLIW instruction 210 selected from two or more types of opcodes of opcodes 202, 203, and 213, where there is at most one instance of opcode 202, at most one instance of opcode 203, and one or more instances of opcodes 213 up to a maximum number corresponding to the number of memory control blocks 240-1 through 240-N of memory interface 240. Thus, any one or more opcodes from control opcodes 202, DSP opcodes 203, and memory opcodes 213, or any combination of same, may present in each VLIW instruction 210.

Accordingly, it should be appreciated that on each clock cycle of a pipeline an entire VLIW instruction 210 is clocked into a pipeline for execution. However, it should be appreciated that an entire VLIW instruction 210 may not be completely executed in a single clock cycle. However, even though execution of a VLIW instruction 210 is not necessarily completed in a single clock cycle, a subsequent VLIW instruction 210 may be clocked into the pipeline of DSP engine 200 on the next clock cycle. Accordingly, VLIW instruction 210-1 may be associated with a clock cycle 211-1 and VLIW instruction 210-M may be associated with a clock cycle 211-M.

Thus, on each clock cycle, a control opcode 202, a DSP opcode 203, and one or more memory opcodes 213 may be output from instruction memory 201 for controller 220, digital signal processing core 230, and memory interface 240, respectively. Along those lines, it should be appreciated that for a Virtex-5 FPGA available from Xilinx, Inc. of San Jose, Calif., engine 200 may be implemented to run programs at 100 percent efficiency. By 100 percent efficiency, it is meant that one or more DSPs 106 used to implement digital signal processing core 230 may be operated in the pipeline mode such that on each clock cycle instruction and data are presented so that a useful operation is performed by the DSP core.

Controller 220, digital signal processing core 230, and memory interface 240 may have separate pipelines of different lengths. While one objective of the DSP engine architecture is to achieve the maximum frequency capabilities of DSPs 106 of FPGA 100, it should be noted that in actual designs controller 220 and memory interface 240 may be implemented using programmable logic of FPGA 100, which may operate at lower than that maximum frequency. Furthermore, while digital signal processing core 230 may be implemented with one or more DSPs 106, it should be understood that an embedded processor core, such as embedded processor 110 of FIG. 1, may be used instead of one or more DSPs 106. Alternatively, a processor implemented in configurable logic may be used to provide digital signal processing core 230. It should be appreciated that if digital signal processing core 230 is implemented using a processor, a wider range of applicability of digital signal processing engine 200 may be facilitated by the degree to which such processor is a general-purpose processor. This may be useful in particular for handling a wider range of digital signal processing-type algorithms, such as matrix operations, Viterbi algorithm applications, and filters. However, for purposes of clarity by way of example and not limitation, it shall be assumed that DSP core 230 is implemented using one or more DSPs 106, such as a 48-bit DSP ("DSP48") as associated with FPGAs available from Xilinx, Inc. of San Jose, Calif. such as the Virtex-4 FPGA.

As it shall be assumed that digital signal processing core 230 includes one or more DSPs 106, it is hereinafter referred to as DSP core 230. Moreover, along those lines, digital signal processing engine 200 is hereinafter referred to as DSP engine 200, and digital signal processing opcode 203 is hereinafter referred to as DSP opcode 203.

As shall be appreciated from the following description, DSP engine 200 may be implemented as coupled to a relatively small core configured in programmable logic of FPGA 100, where such core is implemented using one or more CLBs 102 of FPGA 100. Moreover, DSP engine 200 may be directed for running a particular application. However, DSP engine 200 is scalable for larger applications. For example, multiple DSP engines 200 may be implemented for multichannel applications. For instance, cases that require the same instruction to be performed on each channel can employ single instruction multiple data ("SIMD") parallel cores, where each DSP core processes a group consisting of one or more channels. In such a parallel core application, sharing a controller 220 and memory interface 240 across multiple arithmetic logic units ("ALUs") of DSP cores 203, such as DSP ALU 501 of FIG. 5, may reduce overall overhead associated with control of such parallel processing. In short, this facilitates scaling of parallelism. Moreover, library code may be written with a number of DSP ALUs in SIMD as a parameter. It should be appreciated that by implementing multiple DSP ALUs with control shared across them facilitates scaling for independent channels. Furthermore, such independent channels may be scaled without permutation and without data dependency with respect to control of parallelism.

Control opcode 202 is provided to controller 220. Controller 220 provides an address signal 212 to instruction memory 201 to read the next VLIW instruction 210 on a subsequent pipeline clock cycle, as generally indicated by a dashed line emanating from address signal 212 to VLIW instruction 210-M. DSP opcode 203 is provided to DSP core 230 to instruct how data is to be manipulated. DSP core 230 may optionally provide a signal 307 to controller 220, which is described below in additional detail with reference to FIG. 3. Memory opcodes 213 are provided to memory interface 240, and more particularly, to respective memory control blocks 240-1 through 240-N of memory interface 240. Memory opcodes 213, in addition to specifying source and destination addresses as previously described for reading and writing data, may be configured to calculate location of a source or location of a destination, or a combination thereof. For example, by use of a counter, addresses may be sequentially incremented, such as for sequential reads or sequential writes, or a combination thereof. Such sequential reading or writing may be useful for implementing DSP engine 200 for example in a Finite Impulse Response ("FIR") filter. It should be appreciated that it is possible to have a more complicated form of address calculation, and such calculation may be initiated by use of controller 220 instead of DSP core 230, as described below in additional detail.

DSP core 230 and memory interface 240 may be respectively coupled to memories 250-1 through 250-N via a memory interface bus, which may include separate memory interface buses 245-1 through 245-N for each memory 250. It should be appreciated that each memory interface bus 245 may include both data busing and address busing components. Data signals 235-1 through 235-N may provide data to DSP core 230 bypassing memory interface 240. Address signals 236-1 through 236-N may be provide respective addresses to memory control blocks 240-1 through 240-N of memory interface 240. Note that in some embodiments, one or more of the memories 250-1 through 250-N, and their corresponding memory interface buses, may be combined or merged with appropriate arbitration to determine access. For instance, in some embodiments, memories 250-1 through 250-N may be implemented as a single memory 250 with a single memory interface bus 245 having an arbitration scheme. In other instances, multiple memories 250 may be used.

Memory interface 240, as described below in additional detail, may be implemented with circuitry which is available using programmable logic, such as one or more CLBs 102 of FIG. 1. Additionally, all of controller 220 may be implemented using circuitry available in programmable logic, or alternatively a portion of controller 220 may be implemented using circuitry from a DSP 106 used to implement DSP core 230 for example as well as in part using of one or more CLBs 102. Lastly, instruction memory 201 may be implemented using one or more BRAMs 103 of FPGA 100 of FIG. 1

Figure 3:
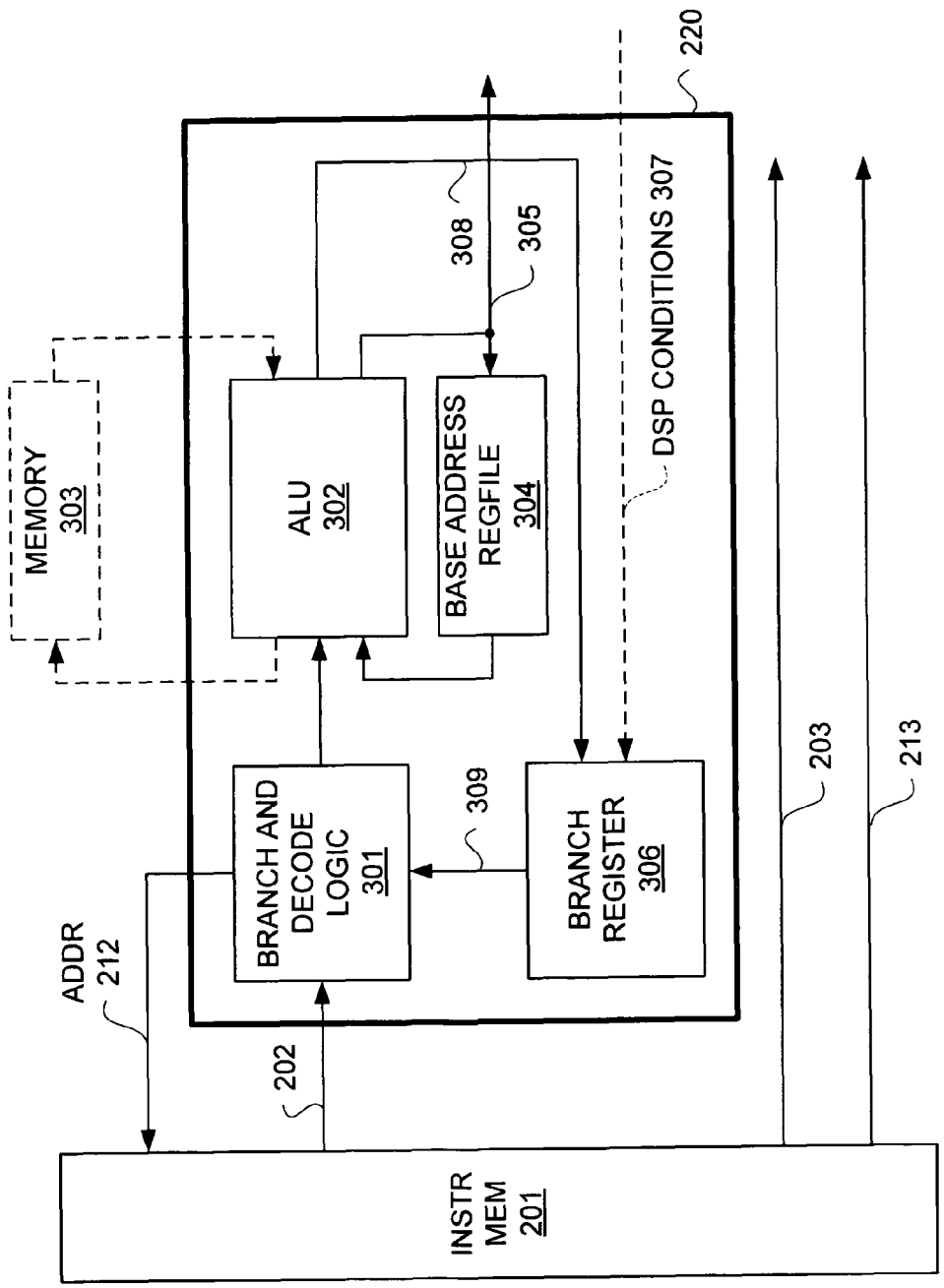
FIG. 3 is a block diagram depicting an exemplary embodiment of a controller coupled to instruction memory both of the DSP engine of FIG. 2.

FIG. 3 is a block diagram depicting an exemplary embodiment of controller 220 coupled to instruction memory 201. Controller 220 includes branch and decode logic 301, ALU 302, base address register file ("regfile") 304, and branch register 306. With renewed reference to FIG. 2 and continued reference to FIG. 3, controller 220 is further described.

Control opcode 202 is provided to branch and decode logic 301. Branch and decode logic 301 is configured to decode control opcode 202 received. In particular, branch and decode logic 301 may be configured to process various branching instructions, as will be detailed below. If such a control opcode 202 indicates that there is a branch to be made for reading the next instruction, such branch address 212 is provided from branch and decode logic 301 back to instruction memory 201 to read the instruction associated therewith. Otherwise, or in addition thereto, branch and decode logic 301 decodes a received control opcode 202 to provide a decoded instruction to ALU 302. ALU 302 may be a relatively simple ALU for purposes of performing addition, subtraction, and comparison. Furthermore, ALU 302 may be implemented for processing integer values only.

ALU 302 may calculate control register values for addresses for memory interface 240. A base address may be loaded from ALU 302 into base address regfile 304. The address loaded into base address regfile 304 may be for writing to or reading from memory 250 associated with memory interface 240, as described below in additional detail. ALU 302 may assert a base address load signal 305 for loading or incrementing a base address in base address regfile 304. Furthermore, base address load signal 305 may be provided to memory interface 240 to instruct a load to or from shadow regfile 601 of FIG. 6, as described below.

An example where ALU 302 may be used to calculate addresses for providing base address load signal 305 is for a filter, such as an FIR filter. In an FIR filter example, the base address is updated in the outer loop, and the inner loop memory access pattern is relative to it and may be handled by the memory controller 240.

ALU 302 may output a branch address 308 for branch register 306 indicating a jump address. Optionally, DSP conditions signal 307 may be used to load branch register 306 whether entire conditions or single bits are used. Additionally, registered single bits may form part of branch register 306 and may represent states for conditional branches. Thus, for example, control opcode 202 after being decoded by branch and decode logic 301 may indicate to ALU 302 to do a compare operation. ALU 302, responsive to such compare operation, may determine an address to be updated. Accordingly, base address regfile 304 or branch register 306, may be updated by ALU 302 responsive to such a comparison. Branch register 306 may provide a branch address 309 to branch and decode logic 301 responsive to status of such DSP conditions or single bits.

Optionally, memory 303, which may be external or internal memory with respect to an integrated circuit in which controller 220 is implemented, may be used as data memory or scratch pad memory for ALU 302. Memory 303 may, though need not be, part of memory 250.

Figure 4:
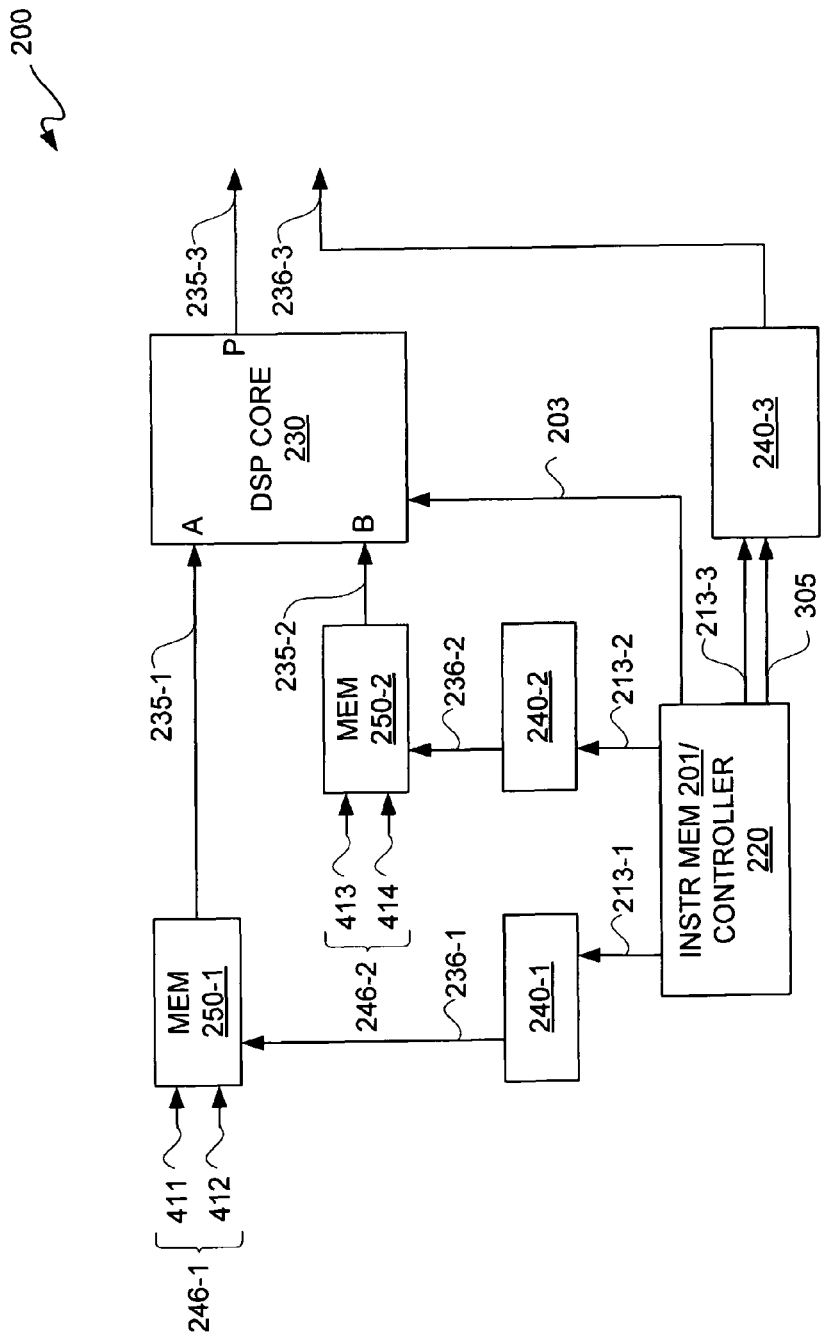
FIG. 4 is a block diagram depicting an exemplary embodiment of a DSP core among other components of the DSP engine of FIG. 2.

FIG. 4 is a block diagram depicting an exemplary embodiment of DSP core 230 among other components of DSP engine 200 of FIG. 2. For purposes of clarity, instruction memory 201 and controller 220 are illustratively shown as one block. With ongoing reference to FIGS. 2 through 4, DSP engine 200 is further described. Controller 220 provides base address load signal 305 to result memory control block 240-3. Result memory control block 240-3 may be for generating addresses for operations. Continuing the above example of three memory control blocks, there may be two input memory control blocks A and B, which in FIG. 4 are memory control blocks 240-1 and 240-2 and one output memory control block P, which in FIG. 4 is memory control block 240-3. Thus, there would be three instances of counters, namely two counters for the input and one counter for the output. While it should be understood that data may be partitioned across multiple memories, it should be further understood that by having separate memory inputs and outputs directly connected to outputs and inputs, respectively, of a DSP core means that sharing bus bandwidth, such as may be associated by a non-directly connected connection, busing such inputs and outputs via one or more common buses, may be avoided for enhanced performance.

More than two input memory interfaces and more than one output memory interface may be used. However, as the number of memories increases, arbitration becomes more problematic. Arbitration may be done via instruction or may be done by memory space mapping with masking. Output of result memory control block 240-3 is address 236-3 which may be provided to memory 250 via bus 245 of FIG. 2 (not shown in FIG. 4) along with resulting data 235-3 from DSP core 230. Address 236-3 may correspond to data 235-3 output from DSP core 230. DSP core 230 may receive a DSP opcode 203 to cause DSP core 230 to select data inputs, as well as to select data outputs, as described below in additional detail.

Instruction memory 201 may provide memory opcodes 213-1 and 213-2 to respective memory input control blocks 240-1 and 240-2 and provide memory opcode 213-3 to memory output control block 240-3. Memory opcodes 213-1 through 213-3 may indicate address information, as previously described. Such address information may be provided to memories 250-1 and 250-2, respectively, via bus 245. Memories 250-1 and 250-2 may be separate memories or mapped address ranges of memory 250.

It should be appreciated that DSP engine 200 is a pipeline, and accordingly, address 411 and data 412 for example may be provided to memory 250-1 while a DSP core 230 is generating data 235-3. Thus, address 411 and data 412 may be provided to memory 250-1 for a write of data 412 at address 411 to memory 250-1. Likewise, address 413 and data 414 may be provided to memory 250-2 for a write of data 414 at address 413 to memory 250-2. Signals 411 and 413 may include control signaling, such as a write enable signal as well as address signals. Furthermore, addresses provided to memories 250-1 and 250-2 via memory control blocks 240-1 and 240-2 responsive to memory opcodes 213-1 and 213-2, respectively, may be used to read data at such addresses from such memories. Accordingly, data 235-1 may be output from memory 250-1 responsive to memory opcode 213-1, and data 235-2 may be read from memory 250-2 responsive to memory opcode 213-2. This may be facilitated using multiport memories, such as BRAMs 103 of FIG. 1. Though illustratively shown separately in FIG. 4, address 411, data 412, address 413, and data 414 may collectively be provided via a common bus 246 to a common memory 250 or separate memories 250, as illustratively shown in FIG. 2, or alternatively may be separately bused to a common or separate memories 250 as illustratively shown in FIG. 4. For example, 411 and 412 may be part of a bus 246-1, and 413 and 414 may be part of a bus 246-2.

Data 235-1 and 235-2 may be provided as input data to DSP core 230. As previously mentioned, such data 235-1 and 235-2 may respectively correspond to input ports A and B, respectively, of DSP core 230. Furthermore, data 235-3 may correspond to output port P of DSP core 230.

Responsive to DSP opcode 203, data 235-1 and 235-2 are processed by DSP core 230 to provide data 235-3. Data 235-3 may be piped out of DSP core 230 with corresponding address 236-3 piped out of result memory control block 240-3.

Figure 5:
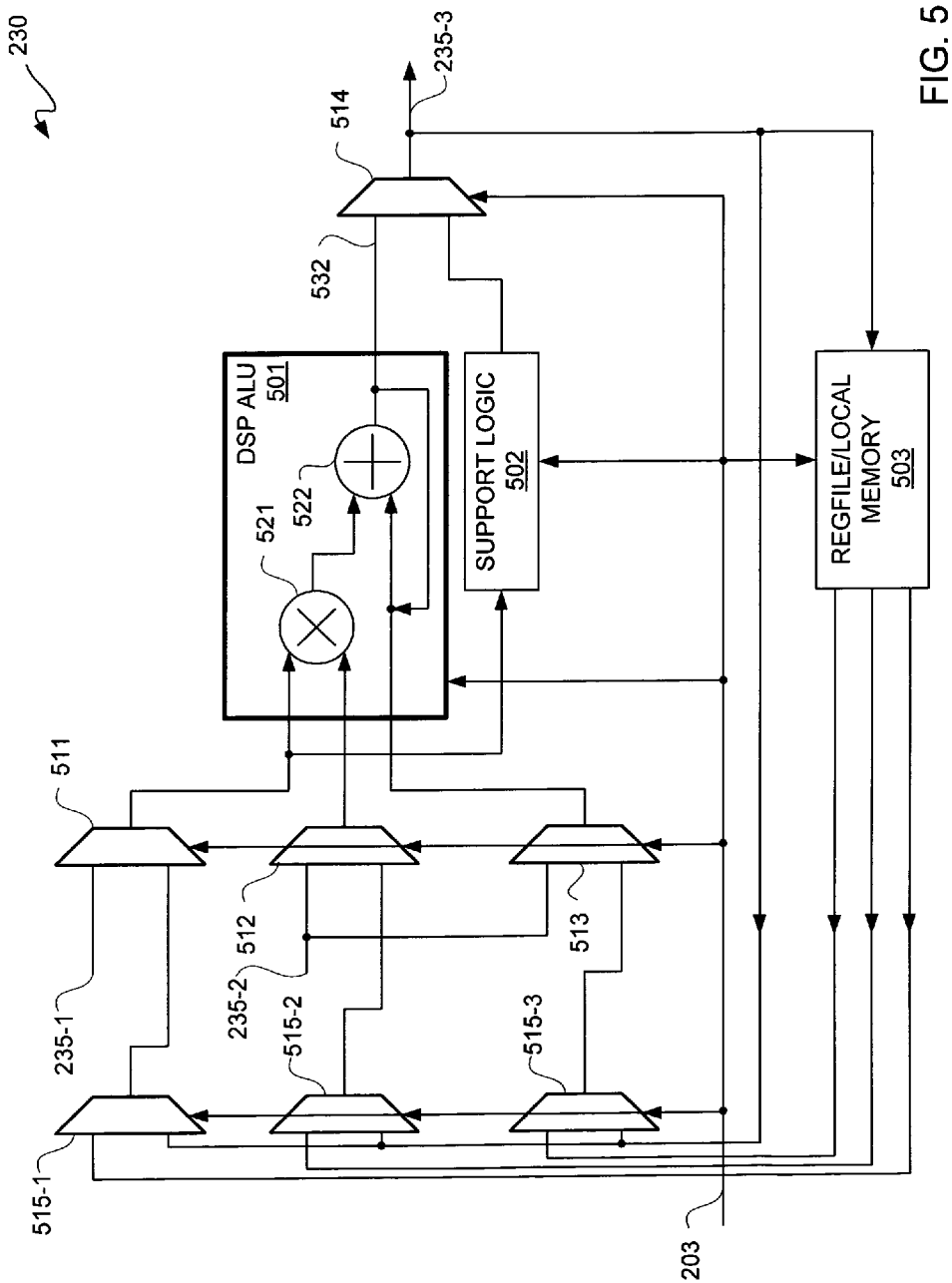
FIG. 5 is a block diagram/circuit diagram depicting an exemplary embodiment of the DSP core of FIG. 4.

FIG. 5 is a block diagram/circuit diagram depicting an exemplary embodiment of DSP core 230. DSP core 230 includes DSP ALU 501, multiplexers 511 through 515, support logic 502, and regfile/local memory 503. With ongoing reference to FIGS. 2 through 5, DSP core 230 is further described.

A DSP opcode 203 is provided as control/select signals to multiplexers 511 through 514, as well as to DSP ALU 501, regfile/local memory 503, support logic 502, and multiplexers 515-1 through 515-3. Output of multiplexers 515-1 through 515-3 are respectively provided as data input to multiplexers 511 through 513. Multiplexers 511 through 513 are input multiplexers to DSP ALU 501, and multiplexer 514 is an output multiplexer of DSP ALU 501. Data 235-1 is provided to an input of multiplexer 511, and data 235-2 is provided as an input to multiplexer 512. Additionally, data 235-2 is provided as an input to multiplexer 513. Accordingly, data inputs 235-1 and 235-2 respectively represent A and B input ports of DSP core 230. Likewise, data 235-3 output from multiplexer 514 represents a P output port of DSP core 230. Alternatively, data output from ALU 501 and provided as an input to multiplexer 514 may be thought of as a P output port of DSP core 230, but for purposes of clarity such data output from ALU 501 is indicated as data 532 for input to multiplexer 514.

Data 235-3 is provided as feedback data to regfile/local memory 503 and provided directly to each of multiplexers 515-1 through 515-3. This direct feedback of data 235-3 to multiplexers 515-1 through 515-3 is a bypass path for bypassing regfile/local memory 503. There are three separate outputs from regfile/local memory 503 which are respectively provided to multiplexers 515-1 through 515-3. Regfile/local memory 503 may be implemented using LUT RAM available in one or more CLBs 102 of FIG. 1. DSP opcode 203 is used as a control signal to provide a read address to regfile/local memory 503 for each of the three outputs therefrom and to provide a write address for writing data 235-3 to regfile/local memory 503. Thus, DSP opcode 203 is used to select either output from regfile/local memory 503 or direct data 235-3 via a bypass path as output from multiplexers 515-1 through 513-3.

Furthermore, support logic 502 may be implemented using one or more CLBs 102. Support logic may be used to provide additional functionality, such as look-up table capability. Furthermore, support logic may be implemented to include square root estimate capability, which may be a look-up table based function. Other features that may be included in support logic include either or both a barrel shifter and a priority encoder.

Data 235-3 fed back either from regfile/local memory 503 or directly via a bypass path is selectable via multiplexers 515-1 through 515-3 for providing inputs to multiplexers 511 through 513. Output of multiplexers 511 and 512 is provided to multiplier 521 of DSP ALU 501. DSP ALU 501 may be implemented with a DSP48 available in FPGAs from Xilinx, Inc. of San Jose, Calif. One or more DSP 106 may be used for implementing DSP ALU 501. For example, for a fixed point application, a 32-bit wide DSP ALU for handing complex numbers may be implemented using ten DSP48s in an example using a Virtex-4 FPGA.

Output of multiplexer 511 is further provided as an input to support logic 502. Output of multiplexer 513 is provided as an input to adder 522. Output of multiplier 521 is further provided as an input to adder 522. Output of adder 522, in addition to being provided as input data 532 to multiplexer 514, is further provided as a feedback input to adder 522. A multiplexer (not shown for purposes of clarity) may be used to switch between output of multiplexer 513 and input data 532 with respect to an input to adder 522. Output of support logic is provided as another input to multiplexer 514. Thus, it should be appreciated that responsive to a DSP opcode 203, ALU 501 processes input data provided by multiplexers 511, 512 and 513 and optionally from DSP Engine inputs via 235-1 and 235-2. This data via feedback may be manipulated by support logic 502, and the output may be selectable, namely the output data from support logic 502 or data 532 via multiplexer 514 responsive to DSP opcode 203.

It should be appreciated that DSP ALU 501 may support all those instructions presently available on a Virtex-4 DSP48, including multiply, multiply-add, multiply-subtract, multiply-accumulate, add, and subtract, among other known, supported DSP48 instructions. Other instructions that may be supported by the addition of support logic 502 may include either or both a barrel shifter and a priority encoder. A bit reverse of an operand, as well as a negative bit reverse, namely a zero-minus reverse number, may be optionally added features provided via support logic 502. Additionally, look-up table capability, as well as square root estimate capability, is added via support logic 502. It should be appreciated that a square root estimate may return a first estimate of a square root for a fast iterative algorithm start. A square root estimate may therefore use a number of MSBs to provide such a square root estimate. Thus, by using the MSBs as a first estimate for a fast start to an iterative algorithm, such iterative algorithm may subsequently converge to a more accurate value of the square root. Additionally, capability of signing of numbers may be added.

As noted above, branch and decode logic 301 of FIG. 3, or more generally controller 220, may be configured to process any and all of the following instructions: a halt, an immediate jump, a conditional jump, and a jump-on registered address. ALU 302 may be configured to execute add, subtract, load immediate, compare equality, compare with zero, immediate add, and immediate subtract instructions. These instructions are described below with some examples in additional detail.

Figure 6:
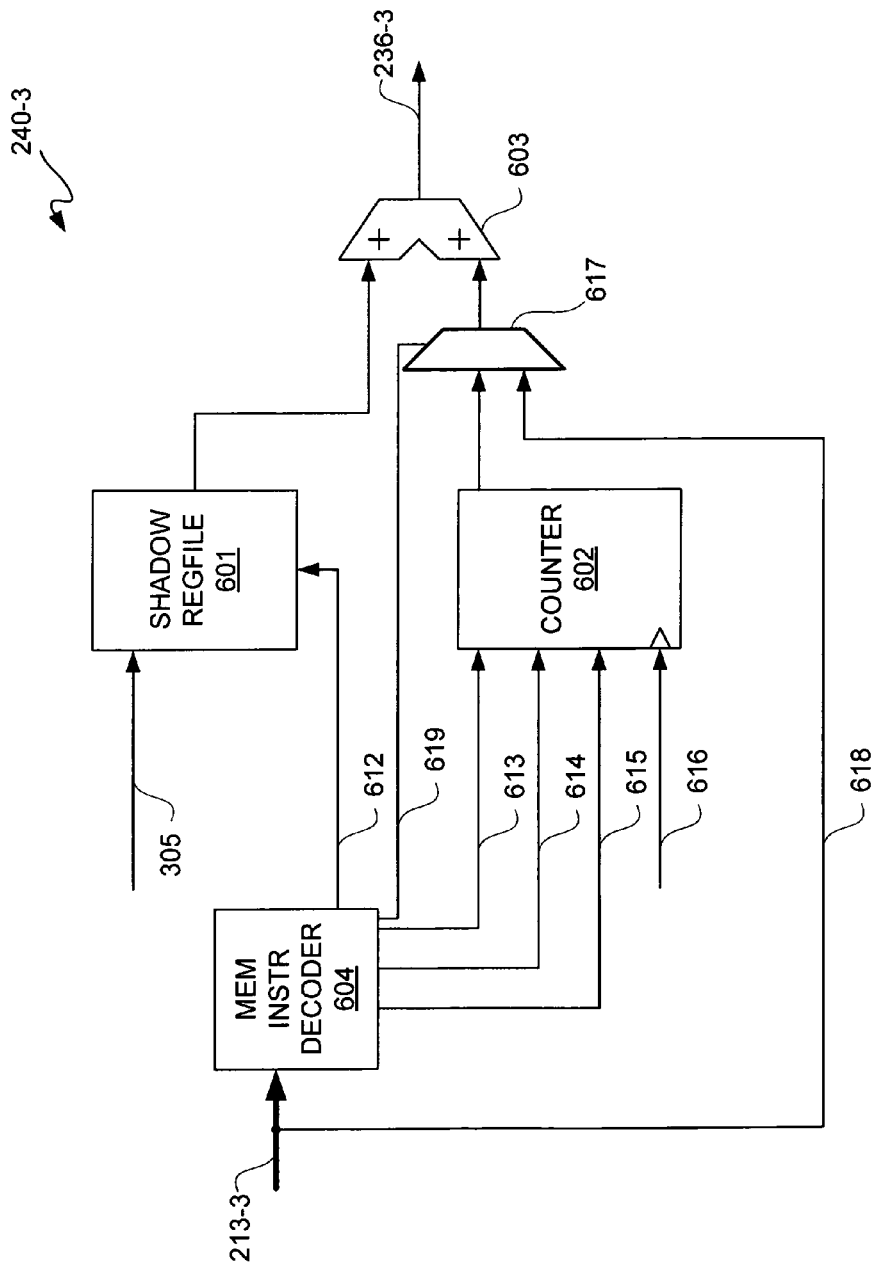
FIG. 6 is a block/circuit diagram depicting an exemplary embodiment of a result memory control block of the DSP engine of FIG. 2.

FIG. 6 is a block/circuit diagram depicting an exemplary embodiment of result memory control block 240-3. Even though a memory control block associated with output in the above example is described, it should be understood that all memory control blocks 240-1 through 240-N, whether associated with input or output, may be copies of one another. With ongoing reference to FIGS. 4 and 6, result memory control block 240-3 is further described. Result memory control block 240-3 includes memory instruction decoder 604, shadow regfile 601, counter 602, and adder 603. Control/address signaling 305 may be provided to shadow regfile 601 for loading of a base address.

Base address register file 304 of controller 220 is shadowed by shadow regfile 601 of FIG. 6. Accordingly, each time a write is made to base address regfile 304, a corresponding write is made to shadow regfile 601 responsive to load signal 305. The bit widths may, though need not be, the same as between base address regfile 304 and shadow regfile 601. Thus, an adjustment to the size of the address information may be made prior to writing same to shadow regfile 601.

Memory instruction decoder 604 receives memory opcode 213-3, which contains control signals for memory instruction decoder 604. Additionally, an address signal 612 from memory instruction decoder 604 may be provided to shadow regfile 601 to select shadow register of shadow regfile 601 from which base address information should be read.

It should be appreciated that there may be multiple base addresses stored in shadow regfile 601. For example, if there were 16 base addresses in shadow regfile 601, these may be 16 separate pointers to respective memory arrays or subarrays for starting at an initial address of each of such memory array or subarray.

Output of shadow regfile 601 is a value associated with a base address which is provided to an input of adder 603. To sequentially increment such base address value, a counter 602 may be configured to provide an output to an input port of adder 603 for addition with a base address value obtained from shadow regfile 601 to provide address 236-3.

Counter 602 may receive a load signal 613 to load counter 602 with a particular starting value. In this manner, counter 602 may be set or reset. A step signal 614 may be provided to counter 602 for setting a step increment for counter 602 to count. Signal 615 may be a clock enable signal provided to counter 602, and signal 616 may be clock signal. Signals 613 through 615 may be provided from memory instruction decoder 604 to counter 602.

A direct address signal 618 may be obtained from memory opcode 213-3 and provided as a data input to multiplexer 617. Output from multiplexer 617 is provided as input to adder 603. Output of counter 602 and direct address signal 618 are provided as inputs to multiplexer 617 for selecting an output to provide as an input to adder 603. Select signal 619 provided as a control select to multiplexer 617 may be provided from memory instruction decoder 604. Thus, memory instruction decoder 604 may be configured to provide signals 612 through 615 and 619. A memory "NOP" may be used to disable clock enable signal 615, and "IMM" (as described below in additional detail) may be used to bypass counter 602 with direct address signal 618. Generated addresses may be either absolute or relative to one of as the base addresses in shadow regfile 601.

Memory interface 240 may include multiple instances of memory control blocks, of which result memory control block 240-3 is a specific instance. Some of such memory control blocks may be associated with input, and one or more of such memory control blocks may be associated with output.

Figure 7:
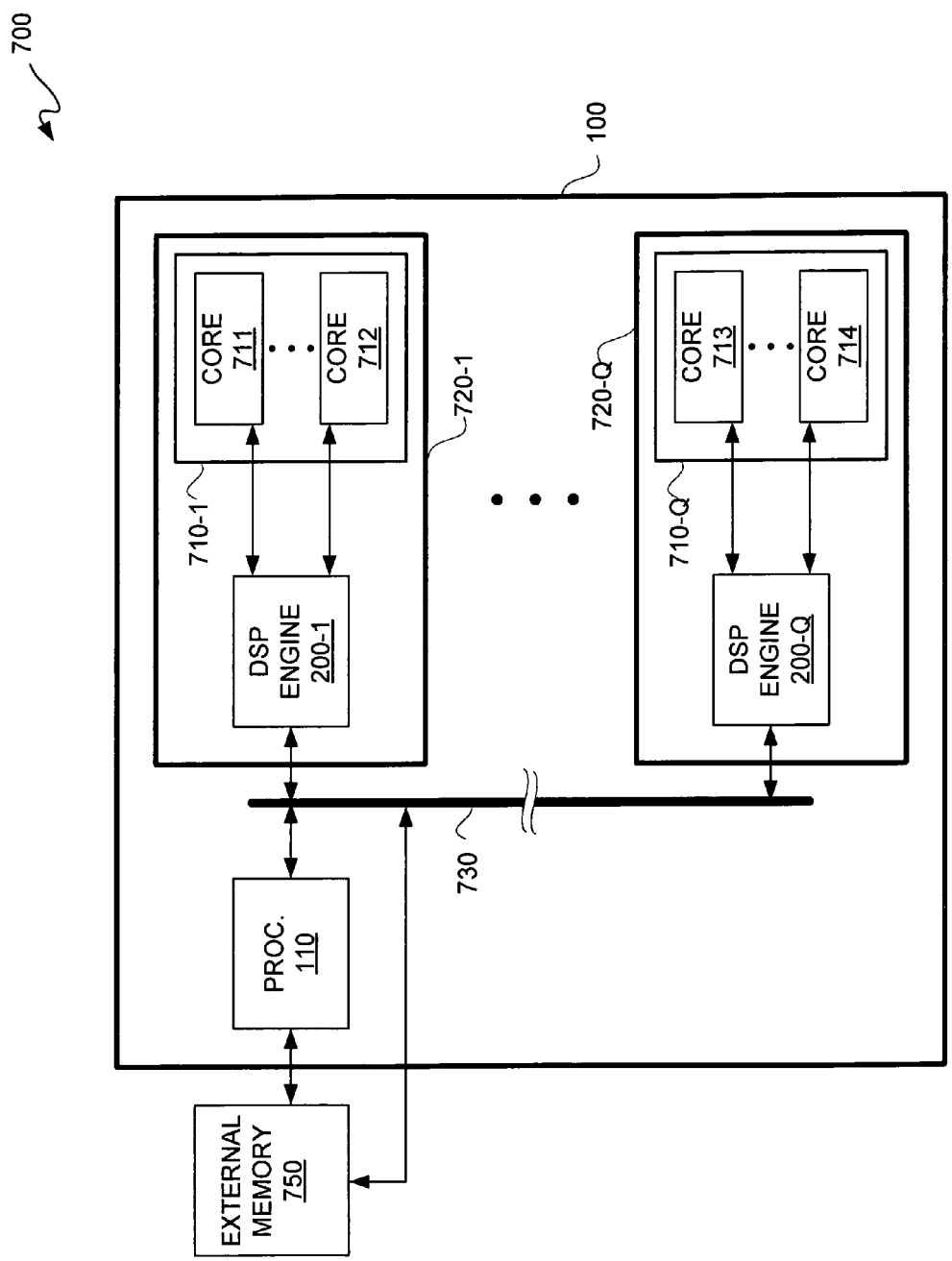
FIG. 7 is a block diagram depicting an exemplary embodiment of a digital signal processing system.

FIG. 7 is a block diagram depicting an exemplary embodiment of a digital signal processing system 700. With reference to FIGS. 1, 2, and 7, digital signal processing system 700 is further described. Digital signal processing system 700 includes FPGA 100 and external memory 750. External memory 750 may be memory 250 of FIG. 2.

FPGA 100 includes processor 110, which may be an embedded processor, or a processor instantiated in configurable logic. Alternatively, processor 110 may be external to FPGA 100. Processor 110 in this particular example is an embedded PowerPC general-purpose processor. However, processor 110 may be any of a variety of known types of microprocessors including those available from Intel, Advanced Micro Devices ("AMD"), and ARM, among others. External memory 750 may be coupled directly to processor 110 though a memory interface, and processor 110 may be coupled via bus 730, which may include busing as previously described with reference to FIG. 2 (e.g., bus 245), to one or more DSP processing blocks 720-1 through 720-Q, for Q a positive integer greater than one. Additionally, external memory 750 may be more directly coupled to one or more DSP processing blocks 720-1 through 720-Q via bus 730.

Each DSP processing block 720 includes a DSP engine 200 and one or more cores instantiated in whole or in part in programmable logic, namely FPGA fabric 710. For example, DSP processing block 720-1 includes DSP engine 200-1 respectively coupled to cores 711 and 712 instantiated in FPGA fabric 710-1. Likewise, DSP processing block 720-Q includes DSP engine 200-Q respectively coupled to cores 713 and 714 instantiated in FPGA fabric 710-Q. For example, optimized cores for performing Viterbi encoding or FFT might be employed, such as LogiCore cores available from Xilinx, Inc. of San Jose, Calif. FPGA fabric 710-1 through 710-Q may represent specific sections of FPGA fabric. Furthermore, it should be appreciated that each DSP processing block 720-1 through 720-Q is respectively coupled to bus 730 via a respective DSP engine 200-1 through 200-Q.

It should be understood that some FPGAs, such as the Virtex FPGA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, DSP functions, memories, storage elements, and math functions. Some cores include an optimally floor planned layout targeted to a specific family of FPGAs. Cores can also be parameterizable, i.e., allowing the user to enter parameters to activate or change certain core functionality.

Thus, as previously mentioned, it should be appreciated that DSP system 700 may include a single DSP block 720, such as DSP block 720-1, or more than one DSP block in parallel though a common bus, such DSP blocks 720-1 through 720-Q via common bus 730. Furthermore, it should be appreciated that the number of DSP blocks 720-1 through 720-Q may be scaled according to the particular application.

It should be appreciated that memory interface 240 as described herein may be used to generate addresses for access to external memory 750. Because memory interface 240 is a separate memory interface from that of processor 110, and because such memory interface 240 has the ability to generate addresses, address generation to some extent may be removed from processor 110 with use of memory interface 240 to generate addresses. At the same time memory addresses may be generated, instructions, which are syllables of a wider instruction word, such as of a VLIW instruction, may be processed. This allows for more sophisticated control over data transfers in contrast to a DMA engine. Thus, it should be appreciated that memory interface 240 facilitates one or more of controller ALU, branch, and decode operations, as well as one or more of DSP core operations, to be run in parallel with memory data fetch and load operations. Furthermore, multiple banks of memory may be addressed in parallel, and data from all of such banks may be accessed and stored in parallel.

It should be appreciated that memory interface 240 is useful for increased access to memory for an embedded system, particularly for an embedded system where the access pattern to memory is complex or data dependent. It should be appreciated that the DSP engine 200 may handle both computations and data management simultaneously, as multiple ALUs are employed, where a portion thereof may run memory address generation in parallel with data operations for example.

Memory interface 240 may be used to generate addresses for each memory port in system 700 using a relatively small amount of logic with lower latency at high frequencies in contrast to prior approaches by others that increased the number of ports by two for each memory address on register files and increased logic and latency to calculate each such address. More particularly, the number of ports on register files does not grow as in prior approaches by others, because addresses are kept local to each memory. Moreover, by bundling memory interface 240 instructions into a wide instruction word, such as a VLIW, a user is provided with substantial control and flexibility over address generation. Thus, it should be appreciated that memory interface 240 as described herein has efficiencies which are at least equivalent to that of a DMA engine, but are capable of being more efficient than a DMA engine for both small data transfers and complex data patterns. Furthermore, flexibility associated with a VLIW machine is provided with DSP engine 200 as previously described.

More particularly, memory interface 240 may be used to generate complex base addresses which are adjusted, incremented, or decremented, by local memory controllers to efficiently obtain multiple complex addresses in parallel. This may be facilitated by copying general purpose registers to each of memory control blocks 240-1 through 240-N, such that such memory control blocks 240-1 through 240-N may generate addresses in parallel due to having local counters for generating local counter values.

Each DSP engine 200 uses multiple memory ports to provide a sufficient amount of data to ensure that each cycle of operation of DSP engine 200 is at least substantially used to facilitate substantial utilization of DSP core 230. Moreover, as indicated above, DSP engine 200 may be operated with 100 percent efficiency. To enhance flexibility, a syllable of a VLIW or VLIW-like instruction, namely a memory opcode 1-1 through 1-N location, is associated with each memory control block 240-1 through 240-N. However, for those instances where a complex address is to be calculated, ALU 302 of controller 220 may be used. Thus, complex base address generation within controller 220 with local address adjustments by memory control blocks 240-1 through 240-N facilitates calculating complex addresses at high frequencies using a modicum of resources, as previously indicated. By high frequencies, it is generally meant in excess of 300 megahertz on a Virtex-4 FPGA.

Each memory opcode, such as memory opcodes 1-1 through 1-N for example, may have a structure of an instruction, operand, and register select. The instruction may be used to control counter 602, and it may be used to set counter 602 to the value of the operand. Furthermore, the instruction of a memory opcode may advance counter 602, up or down, by an operand value in a memory opcode. Moreover, an instruction may bypass counter 602, in which instance the operand of a memory opcode may be used instead of a state of counter 602. A base address is selected by inclusion of a register select in a memory opcode.

Shadow regfile 601, which may be implemented with dual ported memory, may have a read port used to access a base address and a write port used to copy across updates from a control register file, such as to copy base addresses from base address regfile 304. Updates may be broadcast to allow each respective shadow regfiles 601 of memory control blocks 240-1 through 240-N to be current. Thus, responsive to loading a base address in base address regfile 304, each shadow regfile 601 of memory control blocks 240-1 through 240-N may be kept current.

Controller 220 may be used to control program execution, such as a program stored in memory 250, and thus a sequence of instructions may be executed with a sequential generation of addresses using counter 602. Even though each result memory control block 240-3 may generate only one address at a time, by combining the capability of controller 220 with that of one or more memory control blocks 240-1 through 240-N, multiple address modifications may be provided to obtain efficient generation of multiple addresses in parallel.

Thus, it should be appreciated that controller 220 of DSP engine 200 may be used for computing linear algebra functions, providing filters, among other uses as described elsewhere herein. In contrast to a DSP processor, each instruction may have three syllables, namely a control syllable, a DSP instruction syllable, and a memory address syllable, or more particularly a control opcode, a DSP opcode, and one or more memory opcodes. It should be appreciated that all of the opcodes do not have to be equal in terms of resource/time consumption. This is because the VLIW instruction is split into the three types namely, control, DSP, and memory instruction syllables to effect a segregated resource allocation of each of such syllables.

Figure 8:
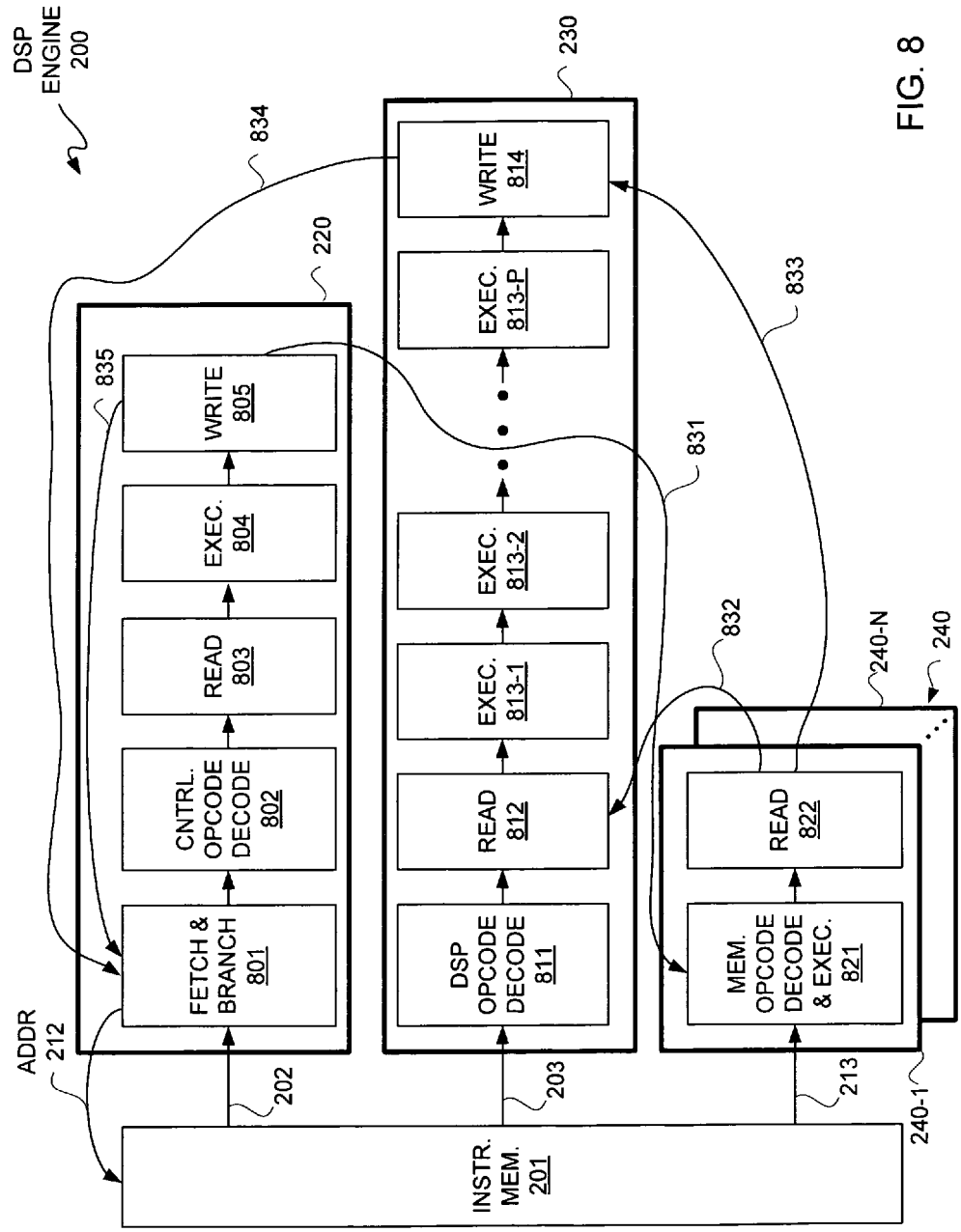
FIG. 8 is a block/flow diagram depicting an exemplary embodiment of the pipeline structure of the DSP engine of FIG. 2.

FIG. 8 is a block/flow diagram depicting an exemplary embodiment of the pipeline structure of DSP engine 200. With renewed reference to FIG. 2 and ongoing reference to FIG. 8, the pipeline structure of DSP engine 200 is further described. Controller 220, DSP core 230, and memory interface 240 are implemented as separate pipelines. A VLIW instruction 210 for example having all three types of opcodes 202, 203, and 213 may have such types of opcodes respectively provided to pipelines, as described below in additional detail. There are multiple memory control blocks 240-1 through 240-N coupled for parallel pipelined operation, where each has two stages. DSP core 230 has the longest pipeline, namely the greatest number of clock cycles to go through all of the stages, of the pipelines among DSP core 230, controller 220 and memory interface 240. Along those lines, memory interface 240 has a shorter pipeline than that of controller 220.

Thus, a control opcode 202 from instruction memory 201 is provided to a pipeline of controller 220 and more particularly to a fetch and branch stage 801. From fetch and branch stage 801, there is a sequence of stages as follows: control opcode decode stage 802, read stage 803, execute stage 804, and write stage 805. Stages 801 through 805 in sequence form a pipeline for controller 220. Instruction memory 201 provides a DSP opcode 203 to a DSP opcode decode stage 811 of the pipeline of DSP core 230. The pipeline of DSP core 230 includes the following sequence of stages: DSP opcode decode stage 811, read stage 812, execution stages 813-1 through 813-P, for P a positive integer greater than one, and write stage 814. The pipeline of memory interface 240 receives one or more memory opcodes 213 to a memory opcode decode and execution stage 821, and output from stage 821 is provided, for example in the instance of memory 250-1, for read stage 822 of the pipeline of memory interface 240. In an embodiment, the pipeline of DSP core 230 includes 14 stages for processing data, unless such data involves complex numbers. If such data involves complex numbers, the pipeline of DSP core 230 may involve 17 stages.

From write stage 805 of the pipeline of controller 220, data may be passed to memory opcode and decode execute stage 821 of memory interface 240, as generally indicated by line 831. Thus, it should be appreciated that line 831 indicates a data dependency between the pipeline of controller 220 and the pipeline of memory interface 240. Furthermore, data output from write stage 805 may be fed back to fetch and branch stage 801, as generally indicated by line 835. As previously described with respect to FIG. 2, responsive to control opcode 202, fetch and branch stage 801 may provide a branch address 212 to instruction memory 201 to obtain another VLIW instruction 210.

Even though first stages of each of the pipelines associated with controller 220, DSP core 230, and memory interface 240 are shown aligned to one another, it should be understood that timing of executing an operation on a stage may depend upon data processing reaching a point in another stage, namely there may be one or more data dependencies. As previously described, because pipelines associated with controller 220, DSP core 230, and memory interface 240 are of different lengths, code may be written to issue jumps to account for these differences in processing cycle time.

For example, memory opcode decode and execution stage 821 of memory interface 240 may receive output from write stage 805 after receiving a memory opcode 213 for processing of data using the pipeline of DSP core 230. To be consistent with the prior example, memory control blocks 240-1 and 240-2, which are input interfaces, are used for read operations. By contrast, memory interface 240-3 of the example is an output interface, and thus is used for a write operation. Thus, a memory opcode 213 provided to memory opcode decode and execution stage 821 and output from write stage 805 provided to stage 821 may be used to produce an input to read stage 822 of the pipeline of memory interface 240-1, and read stage 822 may thereafter produce an output for DSP core 230. For memory control block 240-3, a write stage, and not a read stage 822, would be represented, and the data dependency may change accordingly. If the data dependency of the output of write stage 822 of memory control block 240-3 is associated with write stage 814 of DSP core 230 as generally indicated by line 833, then write stage 822 and write stage 814 are executed at approximately the same time, for example during the same cycle. Alternatively, if the data dependency associated with output from write stage 805 is earlier with respect to processing data in the pipeline of DSP core 230, then read stage 822 of memory control blocks 240-1 and 240-2 may provide an output to read stage 812, as generally indicated by line 832. In this context, read stage 822 and read stage 812 are executed during the same clock cycle.

Output from write stage 814 of the pipeline of DSP core 230 may be provided as an input to fetch and branch stage 801 of the pipeline of controller 220, as generally indicated by line 834. Data dependencies as generally indicated in FIG. 8 with lines 831 through 835 may be accounted for by either a programmer or a compiler, such as by appropriately positioned jumps. It should be appreciated that if only memory interface 240 or controller 220 opcodes are present for executing a VLIW instruction 210, in other words if tasks may be kept out of the pipeline associated with DSP core 230, such tasks may be completed more readily than those involving use of the pipeline of DSP core 230. Accordingly, it should be appreciated that by segregating pipelines, a portion of tasks may be done much more readily than if all pipelines are padded such that they have a same length. Moreover, if only memory interface 240 opcodes are present for executing a VLIW instruction, then associated tasks may be completed more readily than those involving use of either or both the pipeline of DSP core 230 and the pipeline of controller 220.

Below is a description of a set of instructions that may be used with DSP engine 200. This set of instructions is premised upon an FPGA-implemented DSP engine 200. Because FPGAs employ programmable logic, this instruction set may be tailored to specific applications. Thus, for example, if one or more instructions are to be included, such instructions may be added into the architecture of DSP engine 200, such as by configuring support logic 502, as well as into the instruction set used by DSP engine 200. Furthermore, additional known DSP48 operation modes ("opmodes") may be added to the instruction set with little to no additional resource cost. Thus, it should be appreciated that syllables of a VLIW instruction may be tailored to an application. Furthermore, it should be appreciated that for each memory opcode or memory syllable, there are subsyllables for each memory port to allow efficient use of segmented memory. Thus within memory address generation, such subsyllables are applicable to memory ports as previously described with reference to having a plurality of memory control blocks 240-1 through 240-N. It is possible to tailor circuitry to an application, including using programmable logic, to provide the tailored circuitry solution, where such tailored circuitry supports one or more instructions of an instruction set. For example, a function that only uses direct addresses need not employ the counters and shadow register of memory control blocks 240-1 through 240-N.

The basic format of each DSP engine instruction was previously described with reference to FIG. 2 and is not repeated here. Each operation field or syllable, however, is optional, though at least one of such syllables must be present. For example, control opcode 202-1 and DSP opcode 203-1 may be omitted provided, however, there is at least one memory opcode 1-1 of memory opcodes 1-1 through 1-N in VLIW instruction 210-1. Accordingly, it should be appreciated that there are any of a number of combinations of possible opcodes present or not present in a VLIW instruction as described herein. Furthermore, in the following instruction set, the following abbreviations have the following meaning: "creg" means control register; "dreg" means DSP register; "condvar" means condition variable for a single bit value; and "prev" means previous result of DSP core 230.

Furthermore, for purposes of convenience, control syllable opcodes are prefixed with a "C_" and DSP syllable opcode are prefixed with a "D_." Memory opcodes are not prefixed for purposes of clarity. An "NOP" for "no operation" indicates that all functional units of a DSP engine 200 may do nothing for a clock cycle of DSP engine 200. Thus a "C_NOP" means that a control syllable has no operation for a clock cycle of DSP engine 200.

A "C_JMP" followed by an address jumps to the instruction at the specified address. A "C_JC condvar, address" is a conditional jump. If the condition variable condvar is set, a jump to the instruction at the specified address is executed.

The following instructions in this paragraph are all prefaced with a "C_," which is omitted in the following description merely for purposes of clarity. A "HALT" instruction stops DSP engine 200, and counter 602 will be halted, and instructions will not execute. An "ADD" is to add values of specified variables by ALU 302. A "SUB" is for subtraction of values of specified variables by ALU 302. A "CNZ condvar" is a test for a non-zero value. If the value specified is not zero, condvar is set, otherwise condvar is cleared. "CNE condvar, creg1, creg2" is a test of variables for inequality. If creg1 does not equal creg2 for values in control registers, condvar is set, else condvar is cleared. "LDI creg, imm" indicates that the immediate memory value ("imm") is loaded into the specified control register. "JR creg" indicates a jump to an address stored in a control register. "ADDI creg1, creg2, imm" is an immediate ADD of the value of imm and the value in creg2, the result of which is stored in creg1. Likewise, "SUBI" is for an immediate subtraction.

DSP instructions, or DSP syllable opcodes, for the most part may be opcodes of an existing DSP48 block. Table 1 below is a conventional set of DSP48 opcodes. The opcodes in Table 1 below are for a Virtex-4 FPGA, and accordingly the instruction set may be limited or enhanced depending on the DSP blocks functionality. Additionally, bit widths up to 48 for an implementation using a DSP48 in Table 1 are indicated.

The format of DSP instructions is as follows:

TABLE 1

| Mnemonics | | Result | Supported | Bitwidth |
|---|---|---|---|---|
| D_NOP | | 0 | yes | any |
| D_KEEP | res | res = P | yes | any |
| D_LD | res, r0 | res = r0 | | any |
| D_NEG | res, r0 | res = −r0 | | any |
| D_MULT | res, r1, r0 | res = r1 * r0 | yes | any |
| D_ADD | res, r1, r0 | res = r1 + r0 | yes | any |
| D_SUB | res, r1, r0 | res = r1 − r0 | yes | any |

TABLE 1-continued

| Mnemonics | | Result | Supported | Bitwidth |
|---|---|---|---|---|
| D_MADD | res, r2, r1, r0 | res = r2 + r1 * r0 | yes | any |
| D_MSUB | res, r2, r1, r0 | res = r2 − r1 * r0 | yes | any |
| D_ACC | res, r0 | res = P + r0 | | any |
| D_ACCN | res, r0 | res = P − r0 | | any |
| D_NACCN | res, r0 | res = r0 − P | | any |
| D_NACC | res, r0 | res = (− (P + r0)) | | any |
| D_MACC | res, r1, r0 | res = P + r0 * r1 | | any |
| D_MACCN | res, r1, r0 | res = P − r0 * r1 | | any |
| D_LD2P | res | res = 2 * P | | any |
| D_ADD2P | res, r0 | res = 2 * P + r0 | | any |
| D_MACCADD | res, r2, r1, r0 | res = P + (r0 * r1 + r2) | | >18 |
| D_MACCNADD | res, r2, r1, r0 | res = P − (r0 * r1 + r2) | | >18 |
| D_LD2 | res, r0 | res = 2 * r0 | | any |
| D_ACC2 | res, r0 | res = 2 * r0 + P | | any |
| D_MADD2 | res, r2, r1, r0 | res = 2 * r2 + r0 * r1 | | any |
| D_SHP | res | res = SHIFT(P) | yes | any |
| D_SHMACC | res, r1, r0 | res = SHIFT(P) + r0 * r1 | yes | any |
| D_SHMACCN | res, r1, r0 | res = SHIFT(P) − r0 * r1 | | any |
| D_SHACC | res, r0 | res = SHIFT(P) + r0 | | any |
| D_SHACCN | res, r0 | res = SHIFT(P) − r0 | | any |
| D_SHMADD | res, r2, r1, r0 | res = SHIFT(P) + (r0 * r1 + r2) | | >18 |
| D_SHMADDN | res, r2, r1, r0 | res = SHIFT(P) − (r0 * r1 + r2) | | >18 |

If any of the registers r0 through r2 in the above example employs a value of zero, which is designated for special handling, the operand is taken from memory rather than from a local register. From Table 1, SHIFT(P) is an arithmetic right-shift of P by 17 bits.

Thus, for memory instructions or memory opcodes of DSP engine 200, it should be appreciated that output memory need not be present within DSP engine 200. If output memory is not present within DSP engine 200, it may be external to DSP engine 200, and in fact it may be external to a host integrated circuit in which DSP engine 200 is implemented, or it may be input memory of another DSP engine, for DSP engines 200 operating off a common bus as previously described.

There are two forms of memory instructions to access memory, both of which may be used for input memory and output memory, for DSP engine 200. For purposes of clarity by way of example and not limitation, it shall be assumed along the lines of the example illustratively shown in FIG. 4 above that there are three memories, namely two input memories and one output memory. More generally, these may be simply thought of as memory spaces, namely two input memory spaces and one output memory space. However, for purposes of clarity by way of example and not limitation, it shall be assumed that there are two input memory units and one output memory unit.

For purposes of designating instructions, an exclamation mark ("!") may be included to indicate that a write enable ("WE") is active on an output memory. For purposes of clarity by way of example and not limitation, two examples of memory instructions are provided as follows:
(MEM_OP) [!]; and
(MEM_OP_IN__1:MEM_OP_IN__2:MEM_OP_OUT) [!],
where MEM_OP is a placeholder for one of the memory instructions described below. The first memory instruction is actually interpreted like the second memory instruction. In other words, the first memory instruction is assembled to an equivalent three operation instruction.

A "STEP imm [, mreg]" instruction increases the memory counter by the imm value. One or more NEXT instructions following a STEP instruction may be used to increment the counter by the imm value. A further STEP instruction can be used to resize the increment. If mreg is unspecified in a STEP instruction, mreg is automatically set to zero. The content of each memory register, namely mreg, is the same of a corresponding control register, creg; however, there are a number of cycles of delay between them.

A "SETC imm [, mreg]" instruction is to set the counter to a value of imm and access memory at a location of the address of an mreg address plus the imm value added to such address. "IMM imm [, mreg]" is an instruction for an immediate memory access at the address specified by the mreg plus an increment of the imm value. The IMM mnemonic means bypass counter 602 to more directly address memory 250.

For purposes of clarity by way of example and not limitation, FIGS. 9 and 10 are respective program listings. More particularly, FIG. 9, sequentially FIGS. 9-1 through 9-2, is a program listing depicting an exemplary embodiment of a four-by-four matrix multiplication program listing 900. FIG. 10, sequentially FIGS. 10-1 through 10-6, is a program listing depicting an exemplary embodiment of a Cholesky decomposition program listing 1000. Accordingly, it should be appreciated that data intensive algorithms may be implemented using DSP engine 200, such as for matrix operations, including matrix inversion, Cholesky decomposition, matrix multiplication, QR decomposition, filtering, and coder/decoder ("CODEC") operations. Furthermore, more complex algorithms for imaging, including for NMR medical applications, may be implemented using DSP engine 200.

Because each of the instruction syllables of a VLIW instruction as previously described of DSP engine 200 is directed at a particular block, namely at a controller 220, a DSP core 230, or a memory interface 240, there is a tailoring of opcodes to blocks such that different blocks have different pipeline delays. Rather than making the pipeline depth greater of each of the pipelines in order to have a same delay for all such blocks, differences in pipeline depth are used. This is done by separating control instructions which have a significantly smaller delay into a separate execution pipeline from data processing instructions. Thus, DSP engine 200 has different syllables of an instruction word used by different ALUs with different pipeline depths.

More particularly, to accommodate an intensive data exchange between various execution units, namely controller 220, DSP core 230, and memory interface 240, with different pipeline depths, it should be appreciated that communication between pipelines through ports and associated delays between reads and writes among different execution units may be taken into account in a program. Accordingly, a programmer may take these differences in pipeline depth into account explicitly by software. For example, for controller 220 with a significantly shorter depth for example than DSP core 230, controller 220 may be controlled by software or a compiler which takes into account scheduling for data exchange. However, this overhead is tolerable as controller 220 is significantly smaller than DSP core 230; in other words, these are not comparable ALUs. In short, it should be appreciated that because of different pipeline depths, and in particular for different ALUs for controller 220 and DSP core 230, opcodes of a VLIW instruction have different execution times within DSP engine 200. It should be appreciated that for an FPGA, where delays are much larger for some blocks than others, the ability to have software take advantage of differences in such pipelines, such as by jumps, avoids adding delay overhead.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A digital signal processing engine architecture, comprising:
   instruction memory for storing a plurality of instructions including a first instruction;
   the first instruction having at least one first opcode;
   the at least one first opcode being selected from a group consisting of a first control opcode, a first digital signal processing opcode, and a first memory opcode;
   a digital signal processing engine including a control block, a digital signal processing core, and a memory interface;
   the control block coupled to the instruction memory to obtain the first control opcode;
   the digital signal processing core coupled to the instruction memory to obtain the first digital signal processing opcode, the digital signal processing core configurable at least for multiplication of two operands;
   the memory interface coupled to the instruction memory to obtain the first memory opcode, the memory interface comprising a plurality of memory control blocks, wherein each memory control block corresponds to a predetermined memory opcode of a Very Large Instruction Word stored in the instruction memory, and the plurality of memory control blocks are greater or equivalent in number to a maximum number of memory opcodes in any of the plurality of instructions stored in the instruction memory; and
   the control block, the digital signal processing core, and the memory interface are separate pipelines at least two of which have different numbers of stages.

2. The digital signal processing engine architecture according to claim 1, wherein the first instruction is the first Very Large Instruction Word instruction; and
   wherein the control block is configured to fetch a second instruction stored in the instruction memory,
   the second instruction is a second Very Large Instruction Word instruction, the second Very Large Instruction Word instruction having at least one second opcode, and
   the at least one second opcode is selected from a group consisting of a second control opcode, a second digital signal processing opcode, and a second memory opcode.

3. The digital signal processing engine architecture according to claim 2, wherein the plurality of instructions includes the first Very Large Instruction Word instruction and the second Very Large Instruction Word instruction.

4. The digital signal processing engine architecture according to claim 3 wherein there exists a one-to-one sequential correspondence between the plurality of memory control blocks and order of any or all of the memory opcodes in any of the plurality of instructions.

5. The digital signal processing engine architecture according to claim 1, wherein the memory interface is coupled for communication with data storage.

6. The digital signal processing engine architecture according to claim 1, wherein the digital signal processing engine is located in a host integrated circuit, the host integrated circuit being a System-on-a-Chip.

7. The digital signal processing engine architecture according to claim 1, wherein the digital signal processing engine is part of a programmable logic device having programmable logic and digital signal processing blocks,
   the control block and the memory interface being implemented with at least a portion of the programmable logic,
   the digital signal processing core being implemented with at least a portion of the digital signal processing blocks.

8. The digital signal processing engine architecture according to claim 1, wherein the digital signal processing engine is part of a programmable logic device having programmable logic,
   the control block, the digital signal processing core, and the memory interface is implemented with at least a portion of the programmable logic, and
   the digital signal processing core is implemented by configuring configuration memory cells of the portion of the programmable logic to provide a microprocessor.

9. The digital signal processing engine architecture according to claim 1, wherein the digital signal processing engine is part of a programmable logic device having programmable logic and an embedded microprocessor core,
   the control block and the memory interface is implemented with at least a portion of the programmable logic, and
   the digital signal processing core is implemented with the embedded microprocessor core.

10. A method for digital signal processing, comprising:
    obtaining an instruction, the instruction having at least one of three parts, the three parts including a control block opcode part, a digital signal processing opcode part, and a memory opcode part having a plurality of memory opcodes;
    pipelining the instruction with a digital signal processing engine, the digital signal processing engine configured to separately pipeline each of the three parts as follows:
       pipelining the control block opcode part of the instruction with a first pipeline;
       pipelining the digital signal processing opcode part with a second pipeline;
       pipelining the memory opcode part with a third pipeline;
    wherein at least two of the first pipeline, the second pipeline, and the third pipeline have a different number of clocked stages; and
    coupling the plurality of memory opcodes of the instruction stored in an instruction memory to a plurality of memory control blocks, wherein each memory control block corresponds to a predetermined memory opcode of the plurality of memory opcodes, and the plurality of memory control blocks are greater or equivalent in number to a maximum number of memory opcodes in any instruction stored in the instruction memory.

11. The method according to claim 10, wherein the second pipeline is longer than the third pipeline.

12. The method according to claim 10, wherein the first pipeline is longer than the third pipeline.

13. The method according to claim 10, wherein if the instruction does not have the digital signal processing opcode part, fewer clock cycles are used to process the instruction having at least one of the control block opcode part and the memory opcode part.

14. The method according to claim 10, wherein if the instruction does not have the digital signal processing opcode part and the control block opcode part, fewer clock cycles are used to process the instruction having only the memory opcode part present therein.

15. The method according to claim 10, wherein the pipelining of the memory opcode part includes:
   obtaining a plurality of memory opcodes from the instruction; and
   pipelining the plurality of memory opcodes in parallel.

16. A digital signal processing system, comprising:
   a System-on-a-Chip host integrated circuit, the host integrated circuit including a plurality of digital signal processing engines;
   the digital signal processing engines sharing a common bus for communication;
   at least a portion of the digital signal processing engines respectively coupled to at least one associated design core instantiated in programmable resources;
   the digital signal processing engines being coupled to instruction memory for storing a plurality of instructions;
   each of the instructions having at least one opcode;
   the at least one opcode being selected from a group consisting of a control opcode, a digital signal processing opcode, and a memory opcode;
   each of the digital signal processing engines including a control block, a digital signal processing core, and a memory interface;
   the control block coupled to the instruction memory to obtain the control opcode;
   the digital signal processing core coupled to the instruction memory to obtain the digital signal processing opcode, the digital signal processing core configurable at least for multiplication of two operands;
   the memory interface coupled to the instruction memory to obtain the memory opcode, the memory interface comprising a plurality of memory control blocks, wherein each memory control block corresponds to a predetermined memory opcode of a Very Large Instruction Word stored in the instruction memory, wherein the plurality of memory control blocks are greater or equivalent in number to a maximum number of memory opcodes in any of the plurality of instructions stored in the instruction memory; and
   the control block, the digital signal processing core, and the memory interface of each of the digital signal processing engines are separate pipelines at least two of which have different numbers of stages.

17. The digital signal processing system according to claim 16, wherein the instructions are in a Very Large Instruction Word format.

18. The digital signal processing system according to claim 17, wherein a pipeline associated with the memory interface includes the memory blocks for obtaining a plurality of memory opcodes from an instruction of the plurality of instructions for pipelining the plurality of memory opcodes in parallel.

19. The digital signal processing system according to claim 18, wherein the instruction memory is distributed among the digital signal processing engines.

20. A digital signal processing engine, comprising:
   a control block including an arithmetic logic unit, a base address regfile, and a branch/decode circuit;
   the control block coupled to receive a control opcode of an instruction to the branch/decode circuit;
   the branch/decode circuit configured to decode the control opcode to provide a decoded opcode and to obtain a first branch address from the control opcode for branching to obtain another instruction;
   the arithmetic logic unit coupled to receive the decoded control opcode and to populate the base address regfile with a base address responsive to the decoded control opcode;
   the arithmetic logic unit capable of incrementing the base address responsive to the opcode for first address generation; and
   a memory interface comprising a plurality of memory control blocks, wherein each memory control block corresponds to a predetermined memory opcode of a Very Large Instruction Word stored in an instruction memory, wherein the plurality of memory control blocks are greater or equivalent in number to a maximum number of memory opcodes in any instruction stored in the instruction memory.

21. The digital signal processing engine according to claim 20, wherein the control block further includes a branch address register coupled to receive a second branch address and coupled to provide the second branch address to the branch/decode circuit.

22. The digital signal processing engine according to claim 21, wherein the branch address register is coupled to the arithmetic logic unit to cause the second branch address to be provided from the branch address register to the branch/decode circuit.

23. The digital signal processing engine according to claim 20, further comprising:
   a digital signal processing block of a Field Programmable Gate Array, the digital signal processing block including a multiplier and an adder coupled to receive output from the multiplier;
   support logic including a look-up table configured for providing a square root estimate function;
   first multiplexing circuitry coupled to multiplex input to the digital signal processing block and to the support logic; and
   second multiplexing circuitry coupled to multiplex output from the digital signal processing block and the support logic.

24. The digital signal processing engine according to claim 23, further comprising a local storage coupled to receive output from the second multiplexing circuitry and coupled to provide input to the first multiplexing circuitry via third multiplexing circuitry.

25. The digital signal processing engine according to claim 23, wherein output from the second multiplexing circuitry is coupled to provide feedback input to the first multiplexing circuitry selectable as between a bypass path and the local storage via the third multiplexing circuitry.

26. The digital signal processing engine according to claim 20, wherein:
   the plurality of memory control blocks are coupled for parallel pipelined operation;
   the plurality of memory control blocks include shadow regfiles for storing base addresses;
   each of the plurality of memory control blocks include a counter and an adder; and
   the adder coupled to receive output from a shadow regfile of the shadow regfiles and the counter for providing an increment for addition to a base address obtained from the base addresses of the shadow regfile to sequentially generate memory addresses.

27. A non-transitory computer-readable medium having an instruction set stored thereon for a digital signal processing engine, the instruction set when executed on a processor perform a method for digital signal processing, the instruction set comprising:
- control syllable opcodes, digital signal processing syllable opcodes, and memory syllable opcodes;
- the control syllable opcodes including a jump opcode and a conditional jump opcode, the jump opcode and the conditional jump opcode for jumping to a specified address to facilitate use of a plurality of pipelines of different depths; and
- the memory syllable opcodes selected including a no operation opcode, a set counter opcode, and an increase counter opcode,
- wherein the memory syllable opcodes of the instruction set stored in an instruction memory are coupled to memory control blocks, wherein each memory control block corresponds to a predetermined memory opcode of the memory syllable opcodes, and the memory control blocks are greater or equivalent in number to a maximum number of memory syllable opcodes in any instruction stored in the instruction memory.

28. The medium according to claim 27, wherein the digital signal processing syllable opcodes are capable of obtaining a square root estimate from a lookup table for initiating an iterative algorithm to converge to a square root value.

29. The medium according to claim 27, wherein the memory syllable opcodes further include a bypass counter opcode for addressing memory without using a counter of a memory control block.

30. The medium according to claim 27, wherein the control syllable opcodes further include an add opcode, a subtract opcode, and a compare opcode.

31. A digital signal processing engine, comprising:
- memory control blocks coupled for parallel pipelined operation, wherein each memory control block corresponds to a predetermined memory opcode of a Very Large Instruction Word stored in an instruction memory, and the memory control blocks are greater or equivalent in number to a maximum number of memory opcodes in any instruction stored in the instruction memory;
- the memory control blocks each including shadow storage for storing base addresses;
- each of the memory control blocks including a counter and an adder;
- the adder coupled to receive a base address output from the shadow storage; and
- the counter for providing an increment for addition to the base address to sequentially generate memory addresses.

32. The digital signal processing engine according to claim 31, further comprising control circuitry coupled to the memory control blocks for broadcasting base address updates to each of the memory control blocks for storage in the shadow storage respectively associated therewith.

33. The digital signal processing engine according to claim 31, the memory control blocks being programmable responsive to instructions of an instruction set.

34. The digital signal processing engine according to claim 33, wherein the instruction set includes memory syllable opcodes selected from a group consisting of a no operation opcode, a set counter opcode, and an increase counter opcode.

35. The digital signal processing engine according to claim 33, wherein the instruction set includes memory syllable opcodes selected from a group consisting of a no operation opcode, a set counter opcode, a bypass counter opcode, and an increase counter opcode, the bypass counter opcode for addressing memory without using the counter of a memory control block of the memory control blocks.

36. The digital signal processing engine according to claim 31, wherein the memory control blocks each have two stages coupled for parallel pipelined operation.

37. The digital signal processing engine according to claim 36, wherein a first one of the two stages is a decode and execute stage, and a second one of the two stages is a write stage.

38. The digital signal processing engine according to claim 37, wherein the write stage of each of the memory control blocks has data dependency with a digital signal processing core pipeline of the digital signal processing engine.

39. The digital signal processing engine according to claim 38, wherein output of the write stage of each of the memory control blocks is provided to either a read stage or a write stage of the digital signal processing core pipeline responsive to the data dependency.

* * * * *